United States Patent
Gluckman et al.

(10) Patent No.: US 11,276,180 B1
(45) Date of Patent: Mar. 15, 2022

(54) TECHNIQUES FOR ENCODING VIDEO DATA

(71) Applicant: Amazon Technologies, Inc., Seattle, WA (US)

(72) Inventors: Jason Gluckman, Encinitas, CA (US); Ilya Vladimirovich Brailovskiy, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/586,332

(22) Filed: Sep. 27, 2019

(51) Int. Cl.
| | |
|---|---|
| *G06T 7/215* | (2017.01) |
| *H04N 19/567* | (2014.01) |
| *H04N 19/52* | (2014.01) |
| *H04N 19/124* | (2014.01) |

(52) U.S. Cl.
CPC ........... *G06T 7/215* (2017.01); *H04N 19/124* (2014.11); *H04N 19/52* (2014.11); *H04N 19/567* (2014.11)

(58) Field of Classification Search
CPC ...... G06T 7/215; H04N 19/124; H04N 19/52; H04N 19/567
USPC ...................................... 382/103; 375/240.03
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryiey et al. |
| 7,065,196 B2 | 6/2006 | Lee |

(Continued)

FOREIGN PATENT DOCUMENTS

| | | |
|---|---|---|
| CN | 2585521 | 11/2003 |
| CN | 2792061 | 6/2006 |

(Continued)

*Primary Examiner* — Allen C Wong
(74) *Attorney, Agent, or Firm* — Lee & Hayes, P.C.

(57) ABSTRACT

This disclosure describes, in part, techniques for selecting encoding parameters for an electronic device. For instance, remote system(s) may receive, from the electronic device, video data representing a video. The remote system(s) may then analyze the video data to identify portions of the video that represented different areas located within the field of view (FOV) of the electronic device. The areas may include static areas, which do not include recurring motion, and/or dynamic areas, which include recurring motion. Additionally, the remote system(s) may analyze the video data to select encoding parameters for encoding the video data and/or for encoding the portions of the video data that represent the identified areas. The electronic device may then receive the encoding parameters from the remote system(s) and use the encoding parameters to encode additional video data that is generated by the electronic device.

20 Claims, 9 Drawing Sheets

(56) References Cited

U.S. PATENT DOCUMENTS

| | | |
|---|---|---|
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2012/0327241 A1* | 12/2012 | Howe ............... G06K 9/00771 348/155 |
| 2013/0057695 A1 | 3/2013 | Huisking |
| 2013/0162834 A1* | 6/2013 | Wang .................. G06T 5/009 348/164 |
| 2014/0267716 A1 | 9/2014 | Child et al. |
| 2015/0035987 A1 | 2/2015 | Fernandez |
| 2015/0163463 A1 | 6/2015 | Hwang et al. |
| 2018/0176512 A1 | 6/2018 | Siminoff |
| 2019/0261007 A1* | 8/2019 | Emmanuel ............ H04W 24/02 |
| 2019/0384984 A1* | 12/2019 | Rav-Acha .......... G06K 9/00765 |
| 2020/0288149 A1* | 9/2020 | Mao .................... H04N 19/176 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

TECHNIQUES FOR ENCODING VIDEO DATA

BACKGROUND

Home security is a concern for many homeowners and renters. Those seeking to protect or monitor their homes often wish to have video and audio communications with visitors. Audio/Video recording and communication devices (A/V devices) provide this functionality. For example, audio data and video data generated by an A/V device can be uploaded to a remote system. The remote system may then send the audio data and video data to a client device associated with the A/V device. Using the audio data and video data, the client device may display video representing a visitor as well as output sound representing speech from the visitor.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
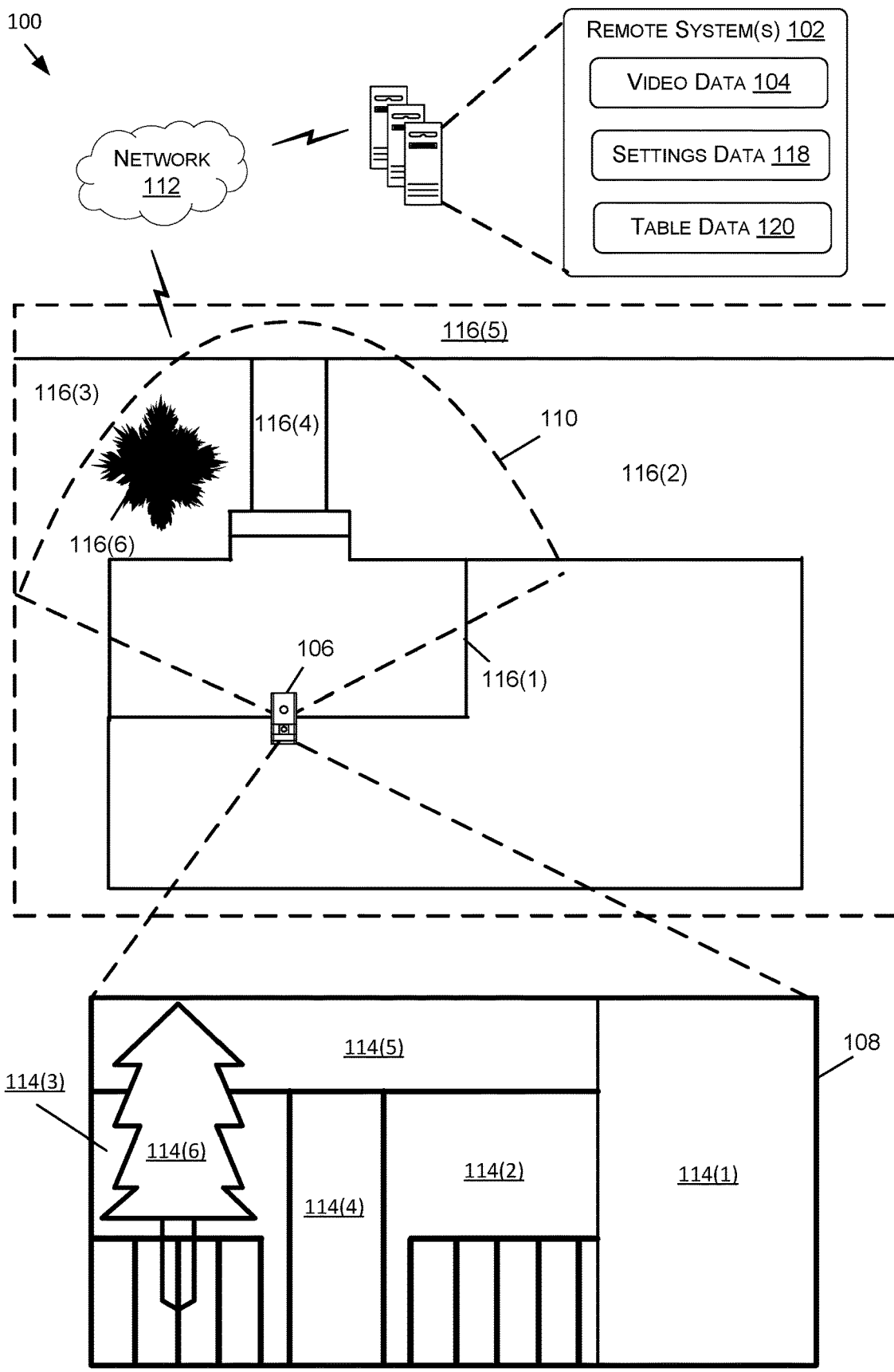
FIG. 1 is a functional block diagram illustrating an example environment that includes remote system(s) selecting parameters for encoding video data on an electronic device, according to various aspects of the present disclosure.

An electronic device (e.g., an A/V device, such as a security camera, and/or any other device that includes at least one camera, referred to herein as "camera device") may generate video data representing a video depicting a field of view (FOV) of the camera of the camera device. The camera device may then send the video data to a remote system (e.g., one or more servers) for storage and/or for relay to a client device (e.g., a smartphone) associated with the camera device. In order to conserve resources of the camera device, the camera device may encode the video data before sending the video data to the remote system. To encode the video data, the camera device may use a video encoder for compressing the video data from an uncompressed format to a compressed format. By encoding the video data, the camera device may reduce the amount of data sent to the remote system, require less bandwidth for sending the video data to the remote system, provide the video data in a format that is adequate for the client device, and/or provide better-quality video for the client device.

To perform video encoding, the video encoder uses parameters that configure how the video is encoded. For example, the video encoder may use parameters that include, but are not limited to, a number of P-Frames and/or B-Frames (and/or other frames) between I-Frames, types of frames, frame sizes, number of frames to include in a Group of Pictures (GOP), bitrate parameters (e.g., a variable bitrate (VBR) parameter), buffer size parameters, quantization parameters, and/or other parameters. Different camera devices may use the same type of video encoder for encoding video data, and each such video encoder may use the same pre-configured parameters to perform the video encoding. However, camera devices installed in different locations may have FOVs with very different characteristics. Therefore, the pre-configured parameters may not be satisfactory for encoding the video data for certain camera devices.

For example, a first camera device may include a first camera having a first FOV, where the first FOV includes first types of objects. In some instances, the first types of objects may include one or more characteristics, such as, but not limited to, the objects are stationary. For example, a first type of object may include, but is not limited to, a sky, a wall, a ceiling, a roof, a sidewalk, a street, a rock, and/or another type of object. Additionally, a second camera device may include a second camera having a second FOV, where the second FOV includes second types of objects. In some instances, the second types of objects may include one or more characteristics, such as, but not limited to, the objects include patterned motion. The patterned motion may include, but is not limited to, an oscillating pattern, a harmonic pattern, a reciprocal motion, or another type of motion. For example, the second type of object may include, but is not limited to, a tree branch, a flag, a wind chime, grass, and/or any other object that may have patterned motion. In some instances, the second type of object may include objects that are irrelevant for security reasons.

As described herein oscillating pattern motion includes the repetitive variation, typically in time, of some measure about a central value (e.g., the point of equilibrium) or between two or more different states. In some instances, vibration is an example of an oscillating pattern motion. Additionally, harmonic pattern motion includes a special type of period or oscillation where the restoring force is directly proportional to the displacement and acts in the opposite directed to that of displacement. Furthermore, a reciprocal motion pattern includes a repetitive up-and-down or back-and-forth linear motion.

The video encoder of the first camera device may use the same parameters to encode video data as the video encoder of the second camera device. However, since the first FOV includes the first types of objects and the second FOV includes the second types of objects, and since the best encoding parameters for those different types of objects may also be different, one of the camera devices may encode better quality video data using those same parameters.

Therefore, in order to improve video encoding, there is a need to select encoding parameters that are customized to individual camera devices.

As such, the present embodiments describe techniques for selecting parameters for a camera device that are customized to the FOV of the camera of the camera device. For example, the camera device may generate video data representing a video depicting the FOV of the camera. In some instances, the camera device generates the video data at different times, such as different times of the day, week, month, year, and/or other times. For example, the camera device may generate first video data representing a first video at 6:00 a.m., generate second video data representing a second video at 12:00 p.m., generate third video data representing a third video at 6:00 p.m., and so forth. In some instances, the camera device generates the video data during a configuration process of the camera device and/or after the camera device is configured. The camera device may then send the video data to remote system(s) that analyze the video data to determine the parameters of the video encoder of the camera device.

For example, the remote system(s) may analyze video data representing frame(s) of the video using one or more image segmentation techniques in order identify portion(s) of the video data that represent first types of objects located within the FOV of the camera. In some instances, a first type of object may include an object that is stationary. For example, a first type of object may include, but is not limited to, a sky, a wall, a ceiling, a roof, a sidewalk, a street, a rock, and/or another type of object. Additionally, or alternatively, in some instances, a first type of object may include an object located in the FOV where the only motion is from other objects that are occasionally located within the area. For example, a first type of object may include a wall that does not include any motion even though other objects, such as people, may occasionally move between the camera of the camera device and the wall, which may cause motion. Motion may be considered "occasional" when the motion occurs less than a threshold amount of time. The threshold amount of time may include, but is not limited to, once every ten minutes, once every hour, once every day, and/or some other threshold.

In some instances, the remote system(s) identify the first types of objects since the first types of objects include the same visual characteristics in the video data generated by the camera device over periods of time. For example, the first types of objects may include the same characteristics in first video data generated at a first time and second video data generated at a second, later time (e.g., the next day). As such, the remote system(s) may be able to pre-determine encoding parameters for portions of the video data that represent the first types of objects, where the camera device is able to encode video data that is later generated by the camera device using the pre-determined encoding parameters. This aspect may save computing resources on the camera device, as the camera device is not required to determine encoding parameters each time the camera device encodes the video data.

In some instances, the remote system(s) may use one or more techniques for categorizing pixels representing the first types of objects. The one or more techniques may include, but are not limited to, image segmentation techniques, edge matching techniques, divide-and-conquer search techniques, gradient matching techniques, interpolation trees techniques, hypothesis and test techniques, pose clustering techniques, and/or any other technique for categorizing pixels. For example, image segmentation technique(s) may include processing video data in order to partition the video data into portions (e.g., sets of pixels) representing objects. The image segmentation technique(s) may include, but are not limited to, semantic segmentation, clustering technique(s), compression-based technique(s), histogram-based technique(s), edge detection technique(s), dual clustering technique(s), multi-scale segmentation technique(s), and/or any other type of image segmentation technique that may be used to segment the frame(s) of the video. These techniques are described in further detail below.

In some instances, after identifying the first types of objects located in the FOV of the camera, the remote system(s) may further analyze the video data to identify the objects. For example, the remote system(s) may analyze a first portion of the video data using one or more computer-vision techniques, which are described herein. Based at least in part on the analysis, the remote system(s) may determine that the first type of object represented by the first portion of the video data includes a wall of a house. Additionally, the remote system(s) may analyze a second portion of the video data using the one or more computer-vision techniques. Based at least in part on the analysis, the remote system(s) may determine that the first type of object represented by the second portion of the video data includes grass. The remote system(s) may use similar techniques to identify other first types of object located in the FOV of the camera.

In some instances, the remote system(s) may further analyze the video data using one or more computer-vision techniques in order to identify portion(s) of the video data that represent second types of objects. A second type of object may include an object with patterned motion. The patterned motion may include, but is not limited to, an oscillating pattern, a harmonic pattern, a reciprocal motion, and/or another type of motion. For example, a second type of object may include, but is not limited to, a tree branch, a flag, a wind chime, grass, and/or any other object that may have patterned motion. In some instances, the remote system(s) may identify the second types of objects by determining that motion vectors associated with the portions of the video data that represent the second types of objects exceed a motion threshold. In some instances, the remote system(s) determine that the motion vectors exceed the motion threshold for a threshold number of frames over a threshold period of time. The threshold number of frames may include, but is not limited to, five frames, ten frames, fifty frames, all the frames, and/or any other number of frames. The threshold period of time may include, but is not limited to, five seconds, thirty seconds, one minute, an entirety of the video represented by the video data, and/or any other period of time.

In some instances, the remote system(s) then validate(s) that the portion(s) of the video data represent the second types of objects. For example, the remote system(s) may analyze additional video data generated at a different time. The remote system(s) may then determine if portion(s) of the additional video data, which represent the same portion(s) of the FOV as the portion(s) of the initial video data, include motion vectors that exceed the motion threshold. Based on determining that the motion vectors exceed the motion threshold, the remote system(s) may validate that the portion(s) of the video data (and/or the FOV) represent the second types of objects.

After identifying the types of objects (e.g., the first types of objects, the second types of objects, etc.) located in the FOV of the camera, the remote system(s) may analyze the video data to select parameters for the video encoder of the camera device. In some instances, the remote system(s) may analyze the video data using one or more optimization techniques to select one or more parameters of the video encoder. Additionally, or alternatively, in some instances, the remote system(s) may analyze specific portions of the video data, which represent specific types of objects, using one or more optimization techniques to select one or more parameters of the video encoder. In either instance, the one or more optimization techniques may include, but are not limited to, rate-distortion optimization, and/or any other optimization technique.

In some instances, the remote system(s) determine the encoding parameters for the portion(s) of the video data that represents the second types of objects since, even though the portion(s) do represent motion in the FOV of the camera, the motion is irrelevant for security reasons. For instance, the user of the camera device may not be concerned with the motion of the second types of objects, but may be concerned with motion from other objects (e.g., people located within the FOV of the camera). Additionally, since the motion of the second types of objects may be recurring (e.g., occur in patterns), the video encoder may by able to use the same encoding parameters for encoding video data that is generated by the camera at various times. Therefore, the remote system(s) may predetermine a set of encoding parameters for the portion(s) of the video data that represent the second types of objects, and the camera device may reuse the predetermined set of encoding parameters when encoding video data. This may save computing resources on the camera device and/or the remote system(s), as the camera device and/or the remote system(s) are not required to determine encoding parameters each time video data generated by the camera is encoded.

To determine the encoding parameters, the remote system(s) may analyze the video data and/or the portion(s) of the video data and, based at least in part on the analysis, the remote system(s) may determine video quality metrics for encoding the video data using different sets of parameters. In some examples, a video quality metric for an encoded video may be determined based at least in part on the amount of distortion (e.g., loss of video quality) against the amount of data required to encode the video data. For example, the video quality metric may be determined using a peak signal-to-noise ratio (PSNR) metric. However, in other examples, a video quality metric for an encoded video may be determined using other metrics associated with the encoded video data. The remote system(s) may then select the set of parameters based at least in part on the video quality metrics for the encoded video data. For example, the remote system(s) may select the set of parameters that provides the highest video quality metric for an encoded video data.

For a first example, the remote system(s) may select quantization parameters for different areas of the FOV of the camera (e.g., different pixels corresponding to the portion(s) of the video data representing the determined types of objects). In some instances, the remote system(s) select the quantization parameters using a table that associates different types of objects with different quantization parameters. For instance, the table may associate walls with a first quantization parameter, sidewalks with a second quantization parameter, roofs with a third quantization parameter, streets with a fourth quantization parameter, and/or so forth. Additionally, in some instances, the table may further associate the different types of objects with different quantization parameters based on the time of day, the amount of ambient light, the color of the objects, and/or other characteristics associated with the objects. For instance, the table may associate streets during the daylight hours with a fifth quantization parameter, streets during nighttime hours with a sixth quantization parameter, red walls with a seventh quantization parameter, black walls with an eighth quantization parameter, and/or so forth.

The remote system(s) may then analyze the video data using one or more computer-vision techniques (described herein) to determine the types of objects represented by the individual portions of the video data and select quantization parameters based on the types of objects. For instance, if first pixels corresponding to a first portion of the video data represent a street, the remote system(s) may use the table to select the fourth quantization parameter for the first pixels corresponding to the first portion of the video data, select the fifth quantization parameter for the first pixels corresponding to the first portion of the video data during the daylight hours, and/or select the sixth quantization parameter for the first pixels corresponding to the first portion of the video data during nighttime hours. The remote system(s) may perform similar processes for pixels corresponding to other portion(s) of the video data that represent other determined types of objects).

In some instances, the remote system(s) may perform the one or more optimization techniques when selecting the quantization parameters. To perform the one or more optimization techniques, the remote system(s) set first quantization parameters (e.g., first adjustment levels) for individual portions of the video data and, based at least in part on the first quantization parameters, determine a first video quality metric associated with first encoded video data. The remote system(s) may further set second quantization parameters (e.g., second adjustment levels) for the individual portions of the video data and, based at least in part on the second quantization parameters, determine a second video quality metric associated with second encoded video data. The remote system(s) may continue this process of setting different quantization parameters for the individual portions of the video data and determining the video quality metrics for the different variations of the quantization parameters.

The remote system(s) may then determine which set of quantization parameters provides the best quality encoding for the video data, and select that set of quantization parameters for performing video encoding on the camera device. For instance, if using a first quantization parameter of +1 for a first portion of the video data and using a second quantization parameter of +5 for a second portion of the video data provides the best quality encoding (e.g., the highest video quality metric), then the remote system(s) may select +1 as the first quantization parameter for first pixels that correspond to the first portion of the video data, and select +5 as the second quantization parameter for second pixels that correspond to the second portion of the video data. Although this example describes using two different quantization parameters for two different sets of pixels corresponding to two portions of the video data, in other examples any number of quantization parameters may be selected for any number of quantization parameters for any number of sets of pixels corresponding to portion of the video data.

In this first example, when determining the quantization parameters, the remote system(s) may apply the quantization parameter for a portion of the video data to the macro-blocks corresponding to the portion of the video data. For instance, if the remote system(s) determine that a first portion of the video data represents a first object from the first types of objects and a second portion of the video data represents a second object from the first types of objects, the remote system(s) may apply a first quantization parameter to the macro-blocks corresponding to the first portion of the video data and apply a second quantization parameter to the macro-blocks corresponding to the second portion of the video data. The macro-blocks may include one or more sizes, such as, but not limited to, 8×8 pixel blocks, 16×16 pixel blocks, 32×32 pixel blocks, and/or any other size.

In some instances, when using the table, the remote system(s) (and/or one or more other computing devices) may generate data representing the table based on analyzing previous video data generated by the camera device and/or one or more additional camera devices. For instance, the remote system(s) may analyze previous video data using the one or more optimization techniques described herein in order to determine the quantization parameters that provide the highest video quality metric when encoding video data. The remote system(s) may then generate the table by associating the determined quantization parameters with the types of objects for which the quantization parameters were applied. For example, if the remote system(s) determine that using a specific quantization parameter for portions of video data representing streets provides the highest video quality metric when encoding video data, then the remote system(s) may associate that specific quantization parameter with streets. The remote system(s) may then perform similar processes for determining quantization parameters for other objects included in the first types of objects and generate the table based on the results.

Additionally to, or alternatively from, selecting the quantization parameters using the table, the remote system(s) may analyze the portion(s) of the video data representing the first types of objects using one or more recognition algorithms. Based on the analysis, the remote system(s) may determine pixel ranges for the portion(s) of the video data and determine the encoding parameters using the pixel ranges. For example, based on the analysis, the remote system(s) may determine a pixel range for a portion of the video data. The pixel range may indicate a range of intensities for the pixels corresponding to the portion. For instance, the pixel range may be between a minimum pixel intensity (e.g., 0, 5, 10, etc.) and a maximum pixel intensity (e.g., 50, 60, 70, etc.) of the pixels corresponding to the portion. The remote system(s) may then determine the quantization parameter for the portion using the pixel range. In some instances, the remote system(s) may determine the quantization parameter based on the minimum pixel intensity, the maximum pixel intensity, the average pixel intensity, and/or using one or more other techniques.

For a second example, the remote system(s) may analyze the video data using one or more optimization techniques to select one or more parameters (referred to, in some examples, as global parameters) for encoding videos. As discussed herein, the one or more parameters may include, but are not limited to, a number of P-Frames and/or B-Frames (and/or other frames) between I-Frames, types of frames, frame sizes, a number of frames to include in a GOP, bitrate parameters (e.g., VBR parameter), buffer size parameters, quantization parameters (e.g., for portions of the video data that do not represent the first types of objects and/or the second types of objects), and/or other parameters. For instance, the remote system(s) may set one or more first parameters for encoding the video data and, based at least in part on the one or more first parameters, determine a first video quality metric associated with first encoded video data. Additionally, the remote system(s) may set one or more second parameters for encoding the video data and, based at least in part on the one or more second parameters, determine a second video quality metric associated with second encoded video data. The remote system(s) may continue this process of setting different parameter(s) for encoding the video data and determining the video quality metrics for the different sets of parameter(s).

The remote system(s) may then determine which parameter(s) provide the best quality encoding for the video data and select the parameter(s) for performing video encoding on the camera device. For instance, if the one or more first parameters provide the highest video quality metric, where the one or more first parameters include three frames between each I-Frame and a frame size of one hundred forty pixels, then the remote system(s) may select the one or more first parameters for encoding video data on the camera device. In some instances, the remote system(s) may select the one or more first parameters in addition to, or alternatively from, the selected quantization parameters described in the first example.

For a third example, the remote system(s) may analyze the video data using one or more optimization techniques to select motion vector parameters. In some instances, the remote system(s) perform the one or more optimization techniques on portion(s) of the video data that represent the second types of objects. For instance, the remote system(s) may set one or more first motion vector parameters for encoding the video data and, based at least in part on the one or more first motion vector parameters, determine a first video quality metric associated with first encoded video data. Additionally, the remote system(s) may set one or more second motion vector parameters for encoding the video data and, based at least in part on the one or more second parameters, determine a second video quality metric associated with second encoded video data. The remote system(s) may continue this process of setting different motion vector parameter(s) for encoding the video data and determining the video quality metrics for the different motion vector parameter(s).

The remote system(s) may then determine which motion vector parameter(s) provide the best quality encoding for the video data and select the motion vector parameter(s) for video encoding on the camera device. For example, if the first video quality metric is higher than the second video quality metric, then the remote system(s) may select the one or more first motion vector parameters. In some instances, the remote system(s) select the motion vector parameter(s) in addition to, or alternatively from, the selected parameters described in the first example above and/or the second example above.

In any of the examples above, the one or more optimization techniques may determine which parameter(s) to test when encoding the video data. For example, the remote system(s) may determine a first video quality metric for first encoded video data using first quantization parameters of +1 for a first portion of the video data and +2 for a second portion of the video data, a second video quality metric for second encoded video using second quantization parameters of 0 for the first portion of the video data and +1 for the second portion of the video data, and a third video quality metric for third encoded video data using third quantization parameters of +2 for the first portion of the video data and +3 for the second portion of the video data. If the remote system(s) determine that the second video quality metric is less than the first video quality metric, but also determine that the third video quality metric is greater than the first video quality metric, then the remote system(s) may determine to encode the video data using fourth quantization parameters of +3 for the first portion of the video data and +4 for the second portion of the video data, because the video quality metrics are increasing as the quantization parameters increase. The remote system(s) may thus continue to increase the quantization parameters until the remote system(s) identify the quantization parameters that provide the highest video encoding metric.

As discussed above, the camera device may generate the video data at different times, such as different times of the day, week, month, year, and/or other times. As such, in some examples, the selected parameters may be associated with the time in which the video data was generated by the camera device. For example, the remote system(s) may use first video data generated at a first time to select first parameters for encoding video data that is generated during the first time period(s), use second video data generated at a second time to select second parameters for encoding video data that is generated during the second time period(s), and so forth. In such examples, the first time period(s) may correspond to the first time at which the first video data was generated. For a first example, if the first video data was generated between 9:00 a.m. and 10:00 a.m., then the first parameters may be used to encode future video data generated between 9:00 a.m. and 10:00 a.m. For a second example, if the first video data was generated during daylight hours (e.g., between 6:00 a.m. and 6:00 p.m.) and the second video data was generated during nighttime hours (e.g., between 6:00 p.m. and 6:00 a.m.), the first parameters may be used to encode future video data generated during the daylight hours (e.g., 6:00 a.m. to 6:00 p.m.) and the second parameters may be used to encode future video data generated during the nighttime hours (e.g., 6:00 p.m. to 6:00 a.m.).

In some examples, the selected parameters may be associated with multiple videos generated at different times. For example, the remote system(s) may select first parameters using first video data generated at a first time, select second parameters using second video data generated at a second time, and so forth. The remote system(s) may then determine the selected parameters for the camera device using the first parameters, the second parameters, and so forth. For instance, the remote system(s) may determine the selected parameters as the average of the first parameters, the average of the second parameters, and so forth. For example, if the first parameters include a quantization parameter of +1 for first pixels corresponding to a first portion of the video data and a quantization parameter of +4 for second pixels corresponding to a second portion of the video data, and the second parameters include a quantization parameter of +5 for the first pixels corresponding to the first portion of the video data and a quantization parameter of +8 for the second pixels corresponding to the second portion of the video data, then the remote system(s) may select a quantization parameter of +3 (e.g., (1+5)/2)=3) for the first pixels corresponding to the first portion of the video data and select a quantization parameter of +6 (e.g., (4+8)/2)=6) for the second pixels corresponding to the second portion of the video data.

Still in some examples, the remote system(s) may use interpolation to select the parameters for the camera device. Interpolation is a method of constructing new data points within the range of a discrete set of known data points. Thus, interpolation in the present embodiments may include constructing new parameters within the range of a discrete set of parameters. For example, the interpolation may include, but is not limited to, linear interpolation, polynomial interpolation, spline interpolation and/or one or more other interpolation techniques.

Linear interpolation may include curve fitting using linear polynomials to construct new data points within the range of set parameters. For instance, if a first parameter is selected for a first time and a second parameter is selected for a second, different time, the remote system(s) may graph points corresponding to the parameters using the parameter value as the y-axis and the time as the x-axis. The remote system(s) may then generate a straight line that connects the first parameter to the second parameter. Using the line, the remote system(s) may determine a new parameter for any given time between the first time and the second time. For example, the first time may include 12:00 p.m., the second time may include 12:00 a.m., the first parameters may include a quantization parameter of +1 for a first area of the FOV, and the second parameters may include a quantization parameter of +5 for the first area of the FOV. In such an example, the remote system(s) may use interpolation to select parameters for encoding video data at 6:00 p.m. For instance, the remote system(s) may select the parameters to include a quantization parameter of +3 for the first area of the FOV.

Polynomial interpolation is a generalization of linear interpolation that does not use a straight line. Rather, in polynomial interpolation, the interpolant (e.g., the line) is replaced with a polynomial of higher degree, where the polynomial still connects the first parameter to the second parameter. When using polynomial interpolation, the remote system(s) may use one or more degrees, such as, but not limited to, a degree of two, three, four, and/or the like.

Spline interpolation is a form of interpolation that uses a special type of piecewise polynomial for the interpolation. More specifically, an elastic ruler (e.g., a line) is generated that is bent and passes through a number of predefined points. In the present embodiments, the points may correspond to the quantization parameters. The spline is then used to determine new quantization parameters.

While the foregoing description provides several examples of selecting parameters for encoding video data, in other examples the remote system(s) may use one or more additional and/or alternative techniques to select the parameters. Additionally, in some examples, the remote system(s) may perform the processes described herein to update the selected parameters. For instance, the remote system(s) may perform the processes described herein to update the selected parameters at given time intervals, such as, but not limited to, once per week, once per month, once every six months, once per year, and the like.

In some instances, the remote system(s) perform the processes described herein in order to improve the performance of the camera device. For example, analyzing the video data to determine the parameters may use a considerable amount of computing resources (e.g., processing resources, storage resources, etc.). Therefore, leveraging computing resources of the remote system(s) to perform the processes described herein, and then sending the preconfigured encoding parameters to the camera device to be used for encoding future videos, reduces the load on the computing resources of the camera device, enabling those resources to be used for other tasks. However, in various embodiments, one or more of the processes described herein with respect to the remote system(s) may be performed by the camera device. For instance, the camera device may perform one or more of the processes described herein to determine the parameters.

As described herein, I-frames represent intra-frames (e.g., keyframes), which have no reference frame and can be decoded on their own. P-frames, which are inter-frames, represent changes from the previous frames (e.g., I-frames), and are decoded using the information from the previous frames. B-frames, which are also inter-frames, represent differences between the previous frames (e.g., I-frames, P-frames, etc.) and the preceding frames (e.g., I-frames, P-frames, etc.), and are decoded using information from the previous frames and the preceding frames. A GOP specifies an order in which the intra-frames and the inter-frames are arranged. In some instances, a GOP begins with an intra-frame followed by one or more inter-frames. A GOP may include any number of frames, such as, but not limited to, one frame, two frames, three frames, four frames, and so forth.

Additionally, quantization may include a lossy compression technique that is achieved by compressing a range of values to a single quantum value. For instance, when the number of discrete symbols in a given video data stream is reduced, the video data stream becomes more compressible. For example, reducing the number of colors required to represent a digital image (e.g., a frame of the video data) makes it possible to reduce the file size of the digital image. In some instances, quantization is performed in order to reduce the amount of information required for the video data by ignoring the high frequency components (e.g., colors). To ignore the high frequency components, each component in the frequency domain is divided by a constant (e.g., a quantization parameter) for that component, and then rounded to the nearest integer. By dividing each component, the number of high frequency components are reduced.

In some instances, to perform quantization, a frame is broken into discrete blocks (e.g., the macro-blocks described herein). The blocks are then subjected to discrete cosine transform (DCT) to calculate the frequency components, both horizontally and vertically. The resulting block is then pre-multiplied by the quantization parameter and divided element-wise by a quantization matrix, which rounds each resultant element. The quantization matrix may be designed to provide more resolution to more perceivable frequency components over less perceivable components in addition to transforming as many components to zero, which may be encoded with the greatest efficiency.

Additionally, or alternatively, in some instances, discrete Fourier transform (DFT) may be used to perform quantization. For example, a frame may be broken into segments (e.g., rows of pixels, columns of pixels, etc.). Fourier coefficients of high frequencies are then calculated for the segments. Additionally, the Fourier coefficients of high frequencies, such as frequencies that exceed a threshold frequency, are discarded. A decompressor then computes the inverse transform of the frame based on the reduced number of Fourier coefficients. While these are just a couple of examples of performing the quantization, in other examples, one or more additional and/or alternative techniques for performing the quantization may be used.

As described herein, in some instances, when describing a pixel, the pixel may include a physical point of reference within a set of data. For instance, the pixel may include a location within an image and/or frame represented by the video data. Additionally, multiple pixels may include locations within the image and/or the frame represented by the video data. For example, pixels corresponding to a portion of the video data that represents a first type of object, such as a street, may include the locations (e.g., points in a grid coordinate system) within the frame that represent the street. Additionally, or alternatively, in some instances, when describing a pixel the pixel may represent an actual data value represented by the video data. For example, the pixel may represent the intensity level of the color at a location within the image and/or frame represented by the video data.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a functional block diagram illustrating an example environment 100 that includes remote system(s) 102 selecting parameters for encoding video data 104 recorded by a camera device 106, according to various aspects of the present disclosure. In the example of FIG. 1, the upper portion of FIG. 1 is a top plan view of the environment 100 and the lower portion of FIG. 1 illustrates frame(s) 108 (and/or video(s) 108) representing the field of view (FOV) of a camera of the camera device 106. For example, and as shown, the camera device 106 (e.g., an A/V device) may generate the video data 104 representing frame(s) 108 (and/or video(s) 108) depicting the FOV 110 of a camera of the camera device 106. In some instances, the camera device 106 generates the video data 104 at different times. In some instances, the camera device 106 generates the video data 104 such that the video(s) 108 represented by the video data 104 are a set length of the time. The set length of time may include, but is not limited to, five seconds, thirty seconds, one minutes, and/or any other length of time. In any instance, the camera device 106 may send the video data 104 to the remote system(s) 102 over one or more network(s) 112. The network(s) 112 may include, but are not limited to, the Internet, a local area network (LAN), a personal area network (PAN), a wide area network (WAN), etc.

After receiving the video data 104, the remote system(s) 102 may analyze the video data 104 using one or more image segmentation techniques in order to identify portions 114(1)-(6) of the video data 104 that respectively represent various types of objects 116(1)-(6) located in the FOV 110. In some instances, image segmentation is the process of using computer-vision analysis to partition an image (e.g., a frame) into multiple segments (e.g., portions, pixels, etc.). Computer-vision analysis includes methods for acquiring, processing, analyzing, and understanding digital images, such as by extracting high-dimensional data from the real world in order to produce numerical or symbolic information. For example, image segmentation may use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For example, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

Semantic segmentation includes assigning each pixel represented by video data to an object class. More specifically, the image data is analyzed in order to generate a mask with regions of interest that are highlighted. To identify the regions of interest, semantic segmentation clusters parts of an image represented by the image data, where each cluster belongs to a respective region of interest. The pixels included in each of the regions of interest are then assigned to an object class.

In some instances, the remote system(s) 102 analyzes the portions 114(1)-(6) of the video data 104 using one or more computer-vision techniques to identify the types of objects 116(1)-(6) represented by the one or more portions 114(1)-(6). For example, the remote system(s) 102 may analyze the first portion 114(1) of the video data 104 to determine the first area 116(1) of the FOV 110 includes a wall, analyze the second portion 114(2) of the video data 104 to determine the second area 116(2) of the FOV 110 includes grass, analyze the third portion 114(3) of the video data 104 to determine the third area 116(3) of the FOV 110 includes grass, analyze the fourth portion 114(4) of the video data 104 to determine the fourth area 116(4) of the FOV 110 includes a sidewalk, analyze the fifth portion 114(5) of the video data 104 to determine the fifth area 116(5) of the FOV 110 includes a street, and/or analyze the sixth portion 114(6) of the video data 104 to determine the sixth area 116(6) of the FOV 110 includes a tree.

The remote system(s) 102 may further determine which of the areas 116(1)-(6) of the FOV 110 include the first types of objects and which areas 116(1)-(6) of the FOV 110 include second types of objects. In some instances, the remote system(s) 102 make the determination based at least in part on the detected types of objects included in the areas 116(1)-(6). For example, the remote system(s) 102 may determine that the first area 116(1) includes a first types of object, since the first area 116(1) represents the wall, determine that the second area 116(2) includes a first type of object, since the second area 116(2) includes the grass, determine that the third area 116(3) includes a first type of object, since the third area 116(3) includes the grass, determine that the fourth area 116(4) includes a first type of object, since the fourth area 116(4) includes the sidewalk, and/or determine that the fifth area 116(5) includes a first type of object, since the fifth area 116(5) includes the street Additionally, the remote system(s) 102 may determine that the sixth area 116(6) includes a second type of object, since the sixth area 116(6) includes the tree.

Additionally, or alternatively, in some instances the remote system(s) 102 identify first types of objects and/or the second types of objects areas using one or more computer-vision techniques. For instance, the remote system(s) 102 may analyze the first portion 114(1) of the video data 104 and, based at least in part on the analysis, determine that there is not patterned motion in the first area 116(1) of the FOV (because this area is the wall). As such, the remote system(s) 102 may determine that the first area 116(1) of the FOV 110 includes a first type of object. The remote system(s) 102 may perform similar processes for one or more of the areas 116(2)-(5) of the FOV 110. Additionally, the remote system(s) 102 may analyze the sixth portion 114(6) of the video data 104 and, based at least in part on the analysis, determine that there is patterned motion in the sixth area 116(6) of the FOV 110. As such, the remote system(s) 102 may determine that the sixth area 116(6) of the FOV 110 includes a second type of object.

The remote system(s) 102 may then select parameters for encoding the video data 104 generated by the camera device 106, where the parameters are represented by settings data 118. In some instances, the remote system(s) 102 may analyze the video data 104 using one or more optimization techniques to select one or more parameters for the camera device 106. In some instances, the remote system(s) 102 may analyze the portions 114(1)-(6) of the video data 104 using the one or more optimization techniques to select one or more parameters for the camera device 106. In any instance, the one or more optimization techniques may include, but are not limited to, rate-distortion optimization, and/or any other optimization technique.

Rate-distortion optimization provides an analytical expression of how much compression can be achieved using compression methods. The compression methods may include transform, quantization, and bit-rate allocation procedures that capitalize on the general shape of rate-distortion functions. The rate is described as the number of bits per data sample to be stored or transmitted. Additionally, the distortion is defined as the expected value of the square of the difference between the input image and the output image, after compression. Since the compression techniques operate on the video data 104 that will be perceived by a user, the distortion measure may be modeled based on human perception. As such, the remote system(s) 102 may select the one or more parameters that provide the best rate-distortion when encoding the video data 104.

For a first example, the remote system(s) 102 may select quantization parameters for the portions 114(1)-(6) of the video data 104. In some instances, the remote system(s) select the quantization parameters using table data 120 that associates different types of objects with different quantization parameters. For instance, the table data 120 may associate walls with a first quantization parameter, dirt with a second quantization parameter, sidewalks with a third quantization parameter, and streets with a fourth quantization parameter. Additionally, in some instances, the table data 120 may further associate the different types of objects with different quantization parameters based on the time of day, the amount of ambient light, and/or the color of the objects. For instance, the table data 120 may associate streets during the daylight hours with a fifth quantization parameter, streets during nighttime hours with a sixth quantization parameter, red walls with a seventh quantization parameter, black walls with an eighth quantization parameter, and/or so forth.

The remote system(s) 102 may then select the quantization parameters for the portions 1114(1)-(5). For instance, the remote system(s) 102 may select the first quantization parameter for first pixels corresponding to the first portion 114(1) of the video data 104 that represents the wall, select the second quantization parameter for second pixels corresponding to the second portion 114(2) of the video data 104 and/or third pixels corresponding to the third portion 114(3) of the video data 104 that each represent dirt, select the third quantization parameter for fourth pixels corresponding to the fourth portion 114(4) of the video data 104 that represents the sidewalk, and select the fourth quantization parameter for fifth pixels corresponding to the fifth portion 114(5) of the video data 104 that represents a street. In some instances, the remote system(s) 102 may further select the quantization parameters based on the time of day, the amount of ambient light, and/or the color of the objects. For instance, if the first area 116(1) includes a red wall, then the remote system(s) 102 may select the seventh quantization parameter for the first pixels. Additionally, if the video data 104 was generated during daylight hours, then the remote system(s) 102 may select the fifth quantization parameter for the fifth pixels.

In some instances, the remote system(s) 102 may further analyze the portions 114(1)-(6) of the video data 104 using one or more optimization techniques to select quantization parameters for the portions 114( )-(6) of the video data 104. In some instances, to perform the one or more optimization techniques, the remote system(s) 102 set first quantization parameters (e.g., first adjustment levels) for the portions 114(1)-(6) of the video data 104 and, based at least in part on the first quantization parameters, determine a first video quality metric associated with first encoded video data. The remote system(s) 102 may further set second quantization parameters (e.g., second adjustment levels) for the portions 114(1)-(6) of the video data 104 and, based at least in part on the second quantization parameters, determine a second video quality metric associated with second encoded video data. The remote system(s) 102 may continue this process of setting different quantization parameters for the portions 114(1)-(6) of the video data 104 and determining the video quality metrics for the different variations of the quantization parameters.

The remote system(s) 102 may then determine which set of quantization parameters provides the highest video quality metric and select the corresponding set of quantization parameters. In some instances, the remote system(s) 102 may perform similar processes to determine set(s) of quantization parameters for different time(s) of the day, week, month, year, and/or other time(s). In some instances, the remote system(s) 102 may use selected sets of quantization parameters determined at the different time(s) to select a single set of quantization parameters for the camera device 106. For instance, the remote system(s) 102 may take the average (and/or median, mode, etc.) of the selected quantization parameters to determine the single set of quantization parameters for the camera device 106.

For a second example, the remote system(s) 102 may analyze the video data 104 using one or more optimization techniques to select one or more parameters for encoding the video data 104. The one or more parameters may include, but are not limited to, a number of P-Frames and/or B-Frames (and/or other frames) between I-Frames, types of frames, frame sizes, a number of frames to include in a GOP, bitrate parameters (e.g., VBR parameter), buffer size parameters, quantization parameters, and/or other parameters. For instance, the remote system(s) 102 may set one or more first parameters for encoding the video data 104 and, based at least in part on the one or more first parameters, determine a first quality metric associated with first encoded video data. Additionally, the remote system(s) 102 may set one or more second parameters for encoding the video data 104 and, based at least in part on the one or more second parameters, determine a second quality metric associated with second encoded video data. The remote system(s) 102 may continue this process of setting different parameter(s) for encoding the video data 104 and determining the video quality metrics for the different parameter(s).

The remote system(s) 102 may then determine which parameter(s) provide the highest video quality metric for an encoded video data and select the corresponding parameter(s) for performing video encoding on the camera device 106. For instance, if the one or more first parameters provide the highest video quality metric, then the remote system(s) 102 may select the one or more first parameters for encoding the video data 104 on the camera device 106. In some instances, the remote system(s) 102 may select the one or more first parameters in addition to, or alternatively from, the selected quantization parameters described in the first example.

For a third example, the remote system(s) 102 may analyze the video data 104 using one or more optimization techniques to select motion vector parameters. In some instances, the remote system(s) 102 perform the one or more optimization techniques on the portions 114(1)-(6) of the video data 104 (e.g., the sixth portion 114(6)). For instance, the remote system(s) 102 may set first motion vector parameters for encoding the video data 104 and, based at least in part on the first motion vector parameters, determine a first quality metric associated with first encoded video data. Additionally, the remote system(s) 102 may set one or more second motion vector parameters for encoding the video data 104 and, based at least in part on the one or more second parameters, determine a second quality metric associated with second encoded video data. The remote system(s) 102 may continue this process of setting different motion vector parameter(s) for encoding the video data 104 and determining the video quality metrics for the different motion vector parameter(s).

The remote system(s) 102 may then determine which motion vector parameter(s) provide the highest video quality metric for an encoded video data and select the corresponding parameter(s) for performing video encoding on the camera device 106. For instance, if the first motion vector parameters provide a higher video quality metric than the second motion vector parameters, then the remote system(s) 102 may select the first motion vector parameters for encoding the video data 104 on the camera device 106. In some instances, the remote system(s) 102 may select the first motion vector parameters in addition to, or alternatively from, the selected quantization parameters described in the first example above and/or the selected parameters described in the second example above.

In the example of FIG. 1, the remote system(s) 102 may then send the settings data 118 to the camera device 106 over the network(s) 112. The camera device 106 may then use the parameters represented by the settings data 118 to encode video data 104 generated by the camera device 106. In some instances, the remote system(s) 102 may later (e.g., periodically) update the parameters using additional video data 104 generated by the camera device 106. In such instances, the remote system(s) 102 may then send to the camera device 106 the settings data 118 representing the updated parameters.

Even though the example of FIG. 1 illustrates the remote system(s) 102 as being remote from the environment 100, in other examples, the remote system(s) 102 may be local to the environment 100. For example, when being local to the environment 100, the remote system(s) 102 may include, but are not limited to, a hub device, a security system device, a voice-activated device, an automation device, an A/V device, a sensor, and/or any other type of electronic device. When the remote system(s) 102 are local to the environment 100, the remote system(s) 102 may communicate with the camera device 106 over the network(s) 112 and/or the remote system(s) 102 may directly communicate with the camera device 106.

Figure 2:
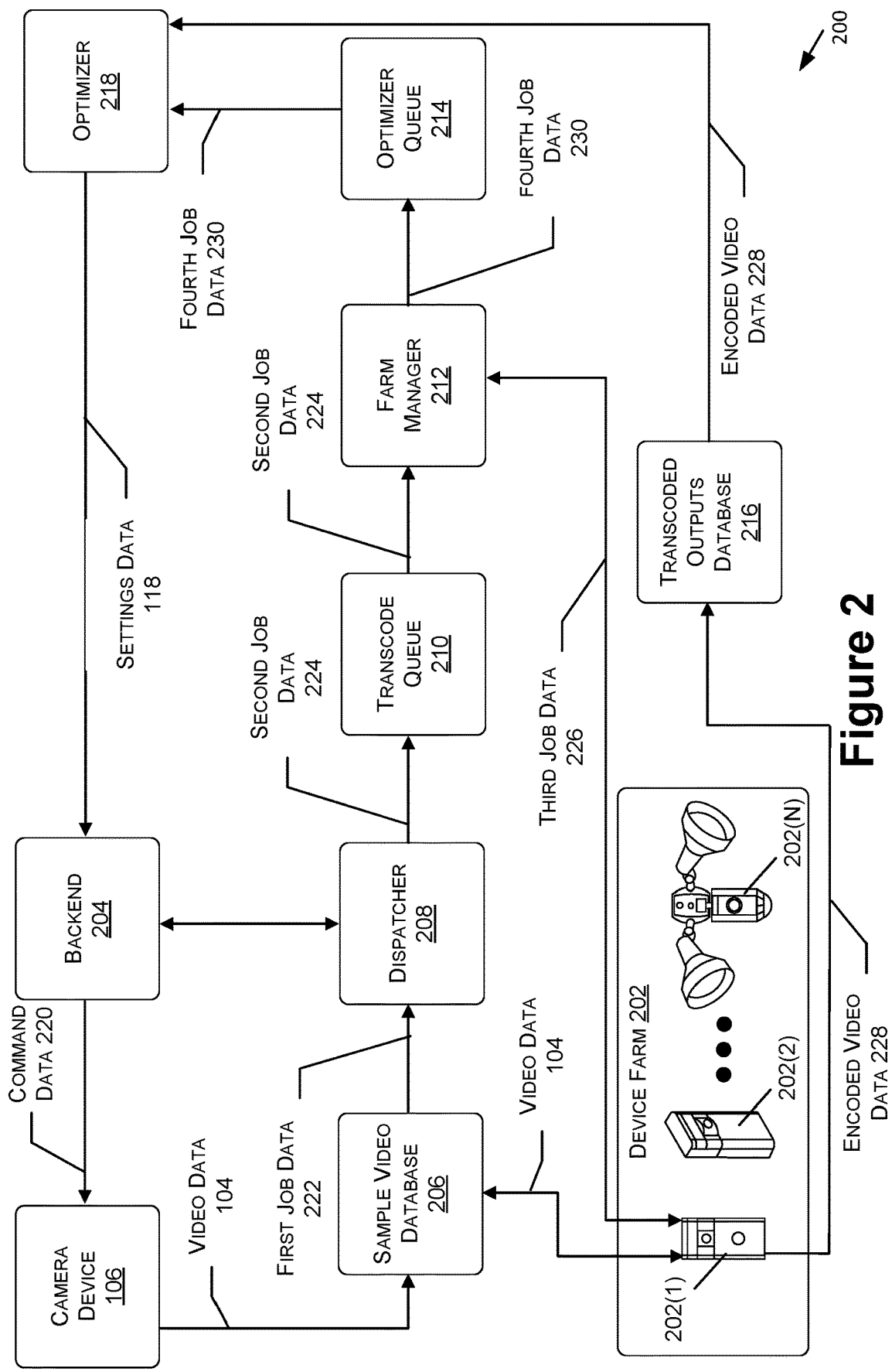
FIG. 2 is a functional block diagram illustrating an example process for selecting parameters for encoding video data, according to various aspects of the present disclosure.

FIG. 2 is a functional block diagram illustrating an example architecture 200 for selecting parameters for encoding video data on the camera device 106, according to various aspects of the present disclosure. In the example of FIG. 2, the architecture 200 includes a device farm 202, a backend 204, a sample video database 206, a dispatcher 208, a transcode queue 210, a farm manager 212, an optimizer queue 214, a transcoded outputs database 216, and an optimizer 218. In some instances, one or more of 202-218 may be included in a single remote system 102. In other instances, one or more of 202-218 may be included in multiple remote systems 102. Additionally, or alternatively, in some instances one or more functions performed by any of 202-218 in the example architecture 200 could be performed by one or more local devices, such as a hub of a home automation/security system. In some instances, the example architecture 200 may not include one or more of 202-218. Additionally, or alternatively, in some instances the example architecture 200 may include one or more additional components.

In some example embodiments, the backend 204 is a network(s) of servers and other devices, such as (but not limited to) storage devices (e.g., cloud storage devices). A server may include computer program(s) and/or device(s) that provide functionality for other programs and/or devices. Cloud storage devices may include one or more servers that provide computer data storage in which digital data is stored. In some instances, the cloud storage devices may be accessed through network(s). The server(s) and/or cloud storage device(s) may execute a set of software instructions that cause one or more computing devices to send command data 220 to the camera device 106, where the command data 220 represents a command to generate and/or send the video data 104. The command data 220 may indicate time(s) for generating the video data 104, given time interval(s) for generating the video data 104, sensor settings to use when generating the video data 104, camera parameters to use when generating the video data 104, and/or other information. The camera parameters may include, but are not limited to, denoise strength(s) for different portions of the video data 104, frames per second to use when generating the video data 104, and/or one or more other camera parameters.

In some instances, the command data 220 instructs the camera device 106 to generate video data 104 representing short sample videos with specific sensor settings. This base video data may be uncompressed or close to uncompressed. In some instances, the video data 104 is generated at different times. In some instances, the command data 220 may request different image signal processor (ISP) parameters and/or camera sensor parameters. For example, the backend 204 may request different denoise strength in different areas.

Based at least in part on receiving the command data 220, the camera device 106 may generate the video data 104 and then upload the video data 104 to the sample video database 206. In some example embodiments, the sample video database 206 may include a database that receives the video data 104 from the camera device 106 and then stores the video data 104. A database may include an organized collection of data that is accessible by remote devices. In some instances, the database may include one or more computing devices and/or memories that store the organized collection of data. In some instances, the sample video data 104 is uploaded to the sample video database 206 in uncompressed form. In other instances, the video data 104 is first compressed before being uploaded to the sample video database 206.

In an embodiment, the dispatcher 208 may include one or more devices (e.g., computing devices, memories, etc.) that store a set of software instructions which, when executed by one or more processors, cause the one or more processors to receive first job data 222 from the sample video database 206, where the first job data 222 indicates that there is a job that is ready to be completed. As such, the set of software instructions may further cause the one or more processors to store second job data 224 in the transcode queue 210, which may include a database. In some instances, the second job data 224 may represent an address (e.g., a link, a Uniform Resource Locator (URL), etc.) for retrieving the video data 104, information about the camera sensor settings, information about the network speed of the camera device 106, information about the battery profile of the camera device 106, and/or other information about the video data 104 and/or the camera device 106.

In some example embodiments, the farm manager 212 may include one or more devices (e.g., computing devices, memories, etc.) that store a set of software instructions which, when executed by one or more processors, cause the one or more processors to retrieve the second job data 224 from the transcode queue 210. The set of software instructions may further cause the one or more processors to select various settings for the video data 104 to be transcoded, where the settings may be based at least in part on the type of video encoder being used by the camera device 106. The set of software instructions may further cause the one or more processors to generate an address (e.g., a link, a URL, etc.) for uploading the outputs. In some instances, the set of software instructions may cause the one or more processors to send third job data 226 to a test device 202(1) that is associated with the camera device 106. For instance, the test device 202(1) may include the same encoder hardware and/or firmware as the camera device 106. Additionally, other test devices 202(2)-(N) may include the same encoder hardware and/or firmware as other types of electronic devices. The third job data 226 may indicate the selected settings for the video data 104 and/or the address for uploading the outputs.

The test device 202(1) receives the video data 104 from the sample video database 206 and encodes the video data 104 using the selected settings from the farm manager 212. After encoding the video data 104, the test device 202(1) sends encoded video data 228 to the transcoded outputs database 216, which, in some example embodiments, includes a database for storing the encoded video data 228. Additionally, in some instances, the test device 202(1) sends data back to the farm manager 212, where the data indicates that the video data 104 has been encoded and sent to the transcoded outputs database 216. Based at least in part on receiving the data, the farm manager 212 may further cause the one or more computing devices to send fourth job data 230 in the optimizer queue 214. The fourth job data may indicate that the optimization for the video data 104 is ready to begin.

In some example embodiments, the optimizer 218 may include one or more devices (e.g., computing devices, memory, etc.) that store is a set of software instructions which, when executed by one or more processors, cause the one or more processors to retrieve the fourth job data 230 from the optimizer queue 214. The set of software instructions may further cause the one or more processors to retrieve the encoded video data 228 from the transcoded output database 216 and the sample video data 104 (e.g., before encoding) from the sample video database 206 (not shown for clarity reasons). After causing retrieving the encoded video data 228 and the video data 104, the set of software instructions may cause the one or more processors to perform one or more of the techniques described herein to select encoding parameters for the camera device 106. The set of software instructions may then cause the one or more processors to send the settings data 118 to the backend 204, where the settings data 118 represents the selected parameters for the camera device 106.

Figure 3:
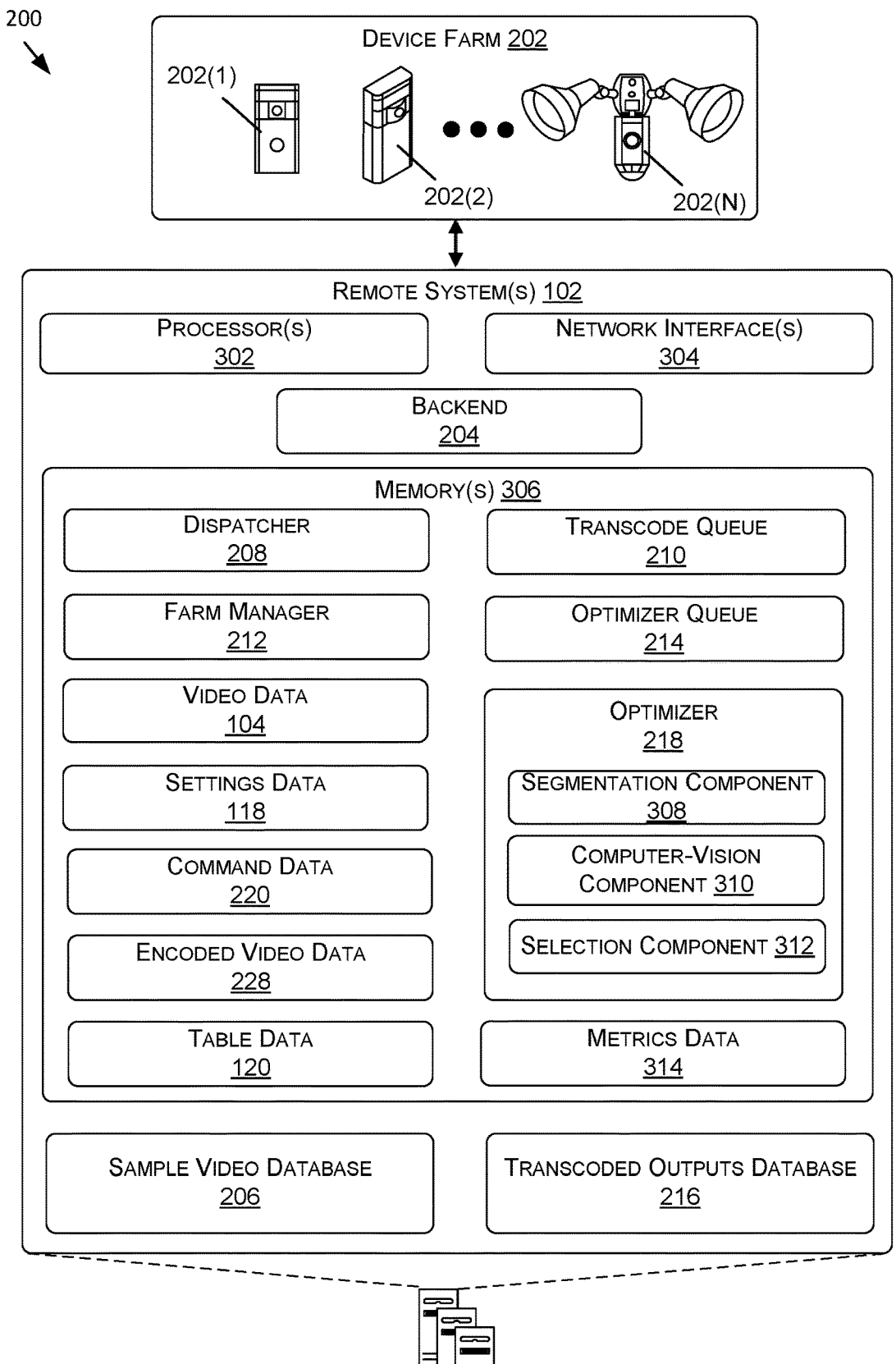
FIG. 3 is a functional block diagram illustrating one example embodiment of remote system(s), according to various aspects of the present disclosure.

FIG. 3 is a functional block diagram illustrating one example embodiment of the remote system(s) 102, according to various aspects of the present disclosure. As shown in FIG. 3, the remote system(s) 102 include the backend 204, processor(s) 302, network interface(s) 304, and memory(s) 306. The memory(s) 306 store at least the dispatcher 208, the transcode queue 210, the farm manager 212, the optimizer queue 214, and the optimizer 218. In some instances, the memory(s) may further include the sample video database 206 and/or the transcoded outputs database 216.

In some instances, the device farm 202, the backend 204, the sample video database 206, the dispatcher 208, the transcode queue 210, the farm manager 212, the optimizer queue 214, the transcoded outputs database 216, and the optimizer 218 are part of a single remote system 102. In other instances, the device farm 202, the backend 204, the sample video database 206, the dispatcher 208, the transcode queue 210, the farm manager 212, the optimizer queue 214, the transcoded outputs database 216, and/or the optimizer 218 are part of two or more remote systems 102. In such instances, each remote system 102 may include respective processor(s) 302, network interface(s) 304, and/or memory 306. For example, in one embodiment, the device farm 202, the sample video database 206, the dispatcher 208, the transcode queue 210, the farm manager 212, the optimizer queue 214, the transcoded outputs database 216, and the optimizer 218 are part of a first remote system, and the backend 204 is part of a second remote system.

As discussed with regard to the example of FIG. 2, the optimizer 218 may include the functionality to select parameters for the camera device 106. As shown in the example of FIG. 3, the optimizer 218 includes at least a segmentation component 308, a computer-vision component 310, and a selection component 312. The segmentation component 308 may include functionality to analyze the video data 104 using one or more segmentation techniques (described herein) in order to identify the portion(s) 114(1)-(6) of the video data 104 represented by the video data 104 that represent the types of objects (e.g., the first types of objects, the second types of objects, etc.) the FOV 110 of the camera of the camera device 106. In some instances, the segmentation component 308 identifies the portion(s) 114(1)-(6) of the video data 104 that represent the first types of objects. Additionally, or alternatively, in some instances, the segmentation component 308 identifies the portion(s) 114(1)-(6) of the video data 104 that represent the second types of objects.

The computer-vision component 310 may include functionality to identify object(s) included in the portion(s) 114(1)-(6) of the video data 104. For example, and using the example of FIG. 1, the computer-vision component 310 may determine that the first portion 114(1) of the video data 104 represents a wall, the second portion 114(2) of the video data 104 represents dirt, and so forth. Additionally, the computer-vision component 310 may include functionality to analyze the portion(s) 114(1)-(6) of the video data to determine which portion(s) 114(6) include the second types of objects. In some instances, the computer-vision component 310 may perform one or more of the techniques described herein with respect to the computer-vision component 416 of the camera device 106.

The selection component 312 may include functionality to select the encoding parameters for the camera device 106. For example, the selection component 312 may analyze the video data 104 using one or more optimization techniques in order to determine video quality metrics for various sets of encoding parameters, where the video quality metrics are represented by metrics data 314. In some instances, the selection component 312 may then select the set of video encoding parameters that provides the highest video quality metric.

As used herein, a processor, such as the processor(s) 302, may include multiple processors and/or a processor having multiple cores. Further, the processor(s) 302 may comprise one or more cores of different types. For example, the processor(s) 302 may include application processor units, graphic processing units, and so forth. In one instance, the processor(s) 302 may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory(s) 306, may include volatile and nonvolatile memory, removable and non-removable media implemented in any method or technology for storage of information, such as computer-readable instructions, data structures, program component, or other data. The memory(s) 306 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory(s) 306 may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s) 302.

Further, functional components may be stored in the memory(s) 306, or the same functionality may alternatively be implemented in hardware, firmware, application specific integrated circuits, field programmable gate arrays, or as a system on a chip (SoC). In addition, while not illustrated, the memory(s) 306 may include at least one operating system (OS) component that is configured to manage hardware resource devices such as the network interface(s), the I/O devices of the respective apparatuses, and so forth, and provide various services to applications or components executing on the processor(s) 302. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 304, may enable messages to be sent and received between the remote server(s) 102, the camera device 106, and/or with one or more other electronic devices. The network interface(s) 304 may include one or more network interface controllers (NICs) or other types of transceiver devices to send and receive messages over network(s) 112. For instance, the network interface(s) 304 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) 406 may include a wide area network (WAN) component to enable message over a wide area network.

The operations and/or functionalities associated with and/or described with respect to the components of the remote system(s) 102 may be performed using cloud-based computing resources. For example, web-based systems such as Elastic Compute Cloud systems or similar systems may be used to generate and/or present a virtual computing environment for performance of some or all of the functionality described herein. Additionally, or alternatively, one or more systems that may be configured to perform operations without provisioning and/or managing servers, such as a Lambda system or similar system, may be used.

Figure 4:
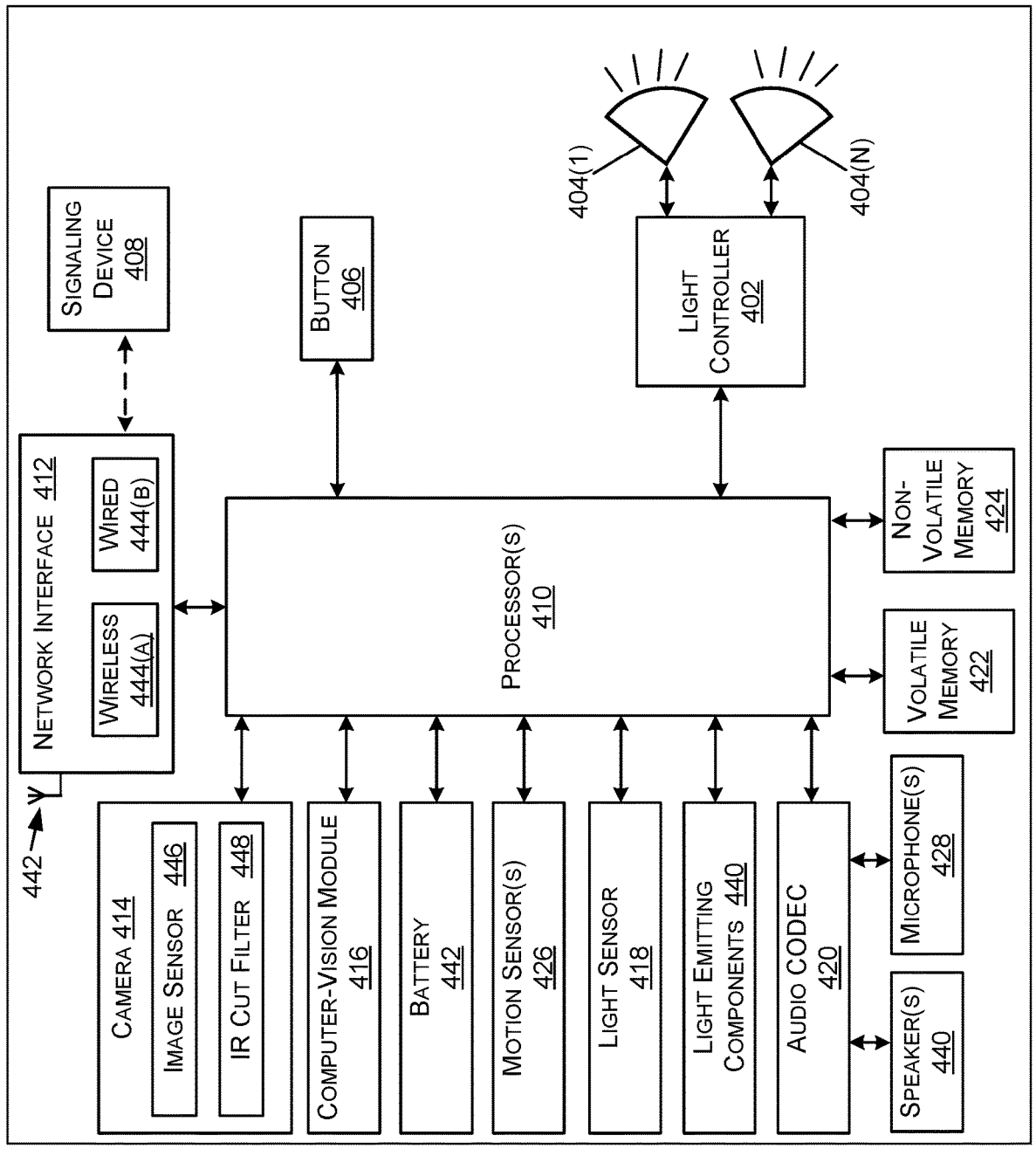
FIG. 4 is a functional block diagram illustrating one example embodiment of an electronic device, according to various aspects of the present disclosure.

FIG. 4 is a functional block diagram for the camera device 106, according to various aspects of the present disclosure. With reference to FIG. 4, the camera device 106 may include a light controller 402, light sources 404(1)-(N), a button 406, a signaling device 408, processor(s) 410, a network interface 412, a camera 414, a computer-vision component 416, a light sensor 418, an audio CODEC (coder-decoder) 420, volatile memory 422, and non-volatile memory 424. The processor(s) 410 (alternatively referred to herein as a "CPU," a "controller," and/or a "microcontroller") may comprise an integrated circuit including a processor core, memory, and programmable input/output peripherals. The processor(s) 410 may receive input signals, such as data and/or power, from the camera 414, motion sensor(s) 426, light sensor 418, microphone(s) 428, speaker(s) 440, and/or the network interface 412, and may perform various functions as described in the present disclosure. In various embodiments, when the processor(s) 410 is triggered by the motion sensor(s) 426, the camera 414, the speaker(s) 440, the microphone(s) 428, the network interface 412, and/or another component, the processor(s) 410 performs one or more processes and/or functions. For example, when the light sensor 418 detects a low level of ambient light, the light sensor 418 may trigger the processor(s) 410 to enable a night vision camera mode. The processor(s) 410 may also provide data communication between various components such as between the network interface 412 and the camera 414.

With further reference to FIG. 4, the network interface 412 may comprise an integrated circuit including a processor core, memory, and programmable input/output peripherals. The network interface 412 may be operatively connected to the processor(s) 410. In some embodiments, the network interface 412 is configured to handle communication links between the camera device 106 and other, external devices, external receivers, external transmitters, and/or external transceivers, and to route incoming/outgoing data appropriately. For example, inbound data from an antenna 442 of the network interface 412 may be routed through the network interface 412 before being directed to the processor(s) 410, and outbound data from the processor(s) 410 may be routed through the network interface 412 before being directed to the antenna 442 of the network interface 412. As another example, the network interface 412 may be configured to transmit data to and/or receive data from a remote network device. The network interface 412 may include wireless 444(a) and wired 444(b) adapters. For example, the network interface 412 may include one or more wireless antennas, radios, receivers, transmitters, and/or transceivers (not shown in FIG. 4 for simplicity) configured to enable communication across one or more wireless networks, such as, without limitation, Wi-Fi, cellular, Bluetooth, Z-Wave, Zigbee, LPWAN(s), and/or satellite networks. The network interface 412 may receive inputs, such as power and/or data, from the camera 414, the processor(s) 410, the button 406 the motion sensors 426, a reset button (not shown in FIG. 4 for simplicity), and/or the non-volatile memory 424. The network interface 412 may also include the capability of communicating over wired connections, such as with a signaling device 408. For example, when the button 406 of the camera device 106 is pressed, the network interface 412 may be triggered to perform one or more functions, such as to transmit a signal over the wired 444(b) connection to the signaling device 408 (although, in some embodiments, the signal be transmitted over a wireless 444(a) connection to the signaling device) to cause the signaling device 408 to emit a sound (e.g., a doorbell tone, a user customized sound, a ringtone, a seasonal ringtone, etc.). The network interface 412 may also act as a conduit for data communicated between various components and the processor(s) 410.

With further reference to FIG. 4, the camera device 106 may include the non-volatile memory 424 and the volatile memory 422. The non-volatile memory 424 may comprise flash memory configured to store and/or transmit data. For example, in certain embodiments the non-volatile memory 424 may comprise serial peripheral interface (SPI) flash memory. In some embodiments, the non-volatile memory 424 may comprise, for example, NAND or NOR flash memory. The volatile memory 422 may comprise, for example, DDR4 SDRAM (double data rate type three synchronous dynamic random-access memory). In the embodiment illustrated in FIG. 4, the volatile memory 422 and the non-volatile memory 424 are illustrated as being separate from the processor(s) 410. However, the illustration of FIG. 4 is not intended to be limiting, and in some embodiments the volatile memory 422 and/or the non-volatile memory 424 may be physically incorporated with the processor(s) 410, such as on the same chip. The volatile memory 422 and/or the non-volatile memory 424, regardless of their physical location, may be shared by one or more other components (in addition to the processor(s) 410) of the present camera device 106.

With further reference to FIG. 4, the camera device 106 may include the camera 414. The camera 414 may include an image sensor 446. The image sensor 446 may include a video recording sensor and/or a camera chip. In one aspect of the present disclosure, the image sensor 446 may comprise a complementary metal-oxide semiconductor (CMOS) array and may be capable of recording high definition (e.g., 722p, 1900p, 4K, etc.) video files. The camera 414 may include a separate camera processor (not shown in FIG. 4 for simplicity), or the processor(s) 410 may perform the camera processing functionality. The processor(s) 410 (and/or camera processor) may include an encoding and compression chip. In some embodiments, the processor(s) 410 (and/or the camera processor) may comprise abridge processor. The processor(s) 410 (and/or the camera processor) may process video recorded by the image sensor 446 and/or audio recorded by the microphone(s) 428, and may transform this data into a form suitable for transfer by the network interface 412. In various embodiments, the camera 414 also includes memory, such as volatile memory that may be used when data is being buffered or encoded by the processor(s) 410 (and/or the camera processor). For example, in certain embodiments the camera memory may comprise synchronous dynamic random-access memory (SD RAM).

The camera 414 may further include an IR cut filter 448 that may comprise a system that, when triggered, configures the image sensor 446 to see primarily infrared light as opposed to visible light. For example, when the light sensor 418 detects a low level of ambient light (which may comprise a level that impedes the performance of the image sensor 446 in the visible spectrum), the light-emitting components 440 may shine infrared light through an enclosure of the camera device 106 out to the environment, and the IR cut filter 448 may enable the image sensor 446 to see this infrared light as it is reflected or refracted off of objects within the field of view of the doorbell. This process may provide the A/V device with the "night vision" function mentioned above.

With further reference to FIG. 4, the camera device 106 may comprise the light sensor 418 and the one or more light-emitting components 440, such as LED's. The light sensor 418 may be one or more sensors capable of detecting the level of ambient light of the surrounding environment in which the camera device 106 may be located. The light-emitting components 440 may be one or more light-emitting diodes capable of producing visible light when supplied with power (e.g., to enable night vision). In some embodiments, when activated, the light-emitting components 440 illuminates a light pipe.

The camera device 106 may further include speaker(s) 440 and/or microphone(s) 428. The speaker(s) 440 may be any electromechanical device capable of producing sound in response to an electrical signal input. The microphone(s) 428 may be an acoustic-to-electric transducer or sensor capable of converting sound waves into an electrical signal. In some embodiments, the camera device 106 may include two or more microphone(s) 428 that are spaced from one another (e.g., located on different sides of the camera device 106) to provide noise cancelling and/or echo cancelling for clearer audio. The speaker(s) 440 and/or microphone(s) 428 may be coupled to an audio CODEC 420 to enable digital audio received by client devices to be decompressed and output by the speaker(s) 440 and/or to enable audio data captured by the microphone(s) 428 to be compressed into digital audio data. The digital audio data may be received from and transmitted to client devices using the network interface 412. For example, when a visitor (or intruder) who is present in the area about the camera device 106 speaks, sound from the visitor (or intruder) is received by the microphone(s) 428 and compressed by the audio CODEC 420. Digital audio data is then sent through the network interface 412 to the remote system(s) 102.

With further reference to FIG. 4, the camera device 106 may be battery powered using a battery 442 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 442 may not be included. In embodiments that include the battery 442, the camera device 106 may include an integrated circuit (not shown) capable of arbitrating between multiple voltage rails, thereby selecting the source of power for the camera device 106. The camera device 106 may have separate power rails dedicated to the battery 442 and the AC power source. In one aspect of the present disclosure, the camera device 106 may continuously draw power from the battery 442 to power the camera device 106, while at the same time routing the AC power to the battery, thereby allowing the battery 442 to maintain a substantially constant level of charge. Alternatively, the camera device 106 may continuously draw power from the AC power to power the doorbell, while only drawing from the battery 442 when the AC power is low or insufficient. Still, in some embodiments, the battery 442 comprises the sole source of power for the camera device 106. In such embodiments, the components of the camera device 106 (e.g., spring contacts, connectors, etc.) are not be connected to a source of AC power. When the battery 442 is depleted of its charge, it may be recharged, such as by connecting a power source to the battery 442 (e.g., using a USB connector).

Although not illustrated in FIG. 4, in some embodiments, the camera device 106 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the camera device 106 so as to reduce interference from heat, pressure, moisture, and/or other stimuli generated by the internal components of the camera device 106.

With further reference to FIG. 4, the camera device 106 may include one or more motion sensor(s) 426. However, in some embodiments, the motion sensor(s) 426 may not be included, such as where motion detection is performed by the camera 414 or another device. The motion sensor(s) 426 may be any type of sensor capable of detecting and communicating the presence of an entity within their field of view. As such, the motion sensor(s) 426 may include one or more (alone or in combination) different types of motion sensors. For example, in some embodiments, the motion sensor(s) 426 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 410, for example, to one or more threshold voltage values to determine if the amount of voltage in the output signal is indicative of motion, and/or if the amount of voltage in the output signal is indicative of motion of an entity that is to be captured by the camera 414 (e.g., motion of a person and/or animal may prompt activation of the camera 414, while motion of a vehicle may not). Although the above discussion of the motion sensor(s) 426 primarily relates to PIR sensors, depending on the embodiment, the motion sensor(s) 426 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultra-sonic-type motion sensor, the output signal may include radio wave disturbance from a tomographic-type motion sensor, and/or the output signal may include other data types for other sensor types that may be used as the motion sensor(s) 426 of the camera device 106.

In some embodiments, computer-vision module(s) (CVM) 416 may be included in the camera device 106 as the motion sensor(s) 426, in addition to, or alternatively from, other motion sensor(s) 426. For example, the CVM 416 may be a low-power CVM (e.g., Qualcomm Glance) that, by operating at low power (e.g., less than 2 mW of end-to-end power), is capable of providing computer-vision capabilities and functionality for battery powered devices (e.g., the camera device 106 when powered by the battery 442). The low-power CVM may include a lens, a CMOS image sensor, and a digital processor that may perform embedded processing within the low-power CVM itself, such that the low-power CVM may output post-processed computer-vision metadata to the processor(s) 410 (e.g., via a serial peripheral bus interface (SPI)). As such, the low-power CVM may be considered to be one or more of the motion sensor(s) 426, and the data type output in the output signal may be the post-processed computer-vision metadata. The metadata may include information such as the presence of a particular type of entity (e.g., person, animal, vehicle, parcel, etc.), a direction of movement of the entity, a distance of the entity from the camera device 106, etc. In various embodiments, the motion sensor(s) 426 include a plurality of different sensor types capable of detecting motion such as PIR, AIR, low-power CVM, and/or cameras.

As a result of including the CVM 416, some of the present embodiments may leverage the CVM 416 to implement computer-vision for one or more aspects, such as motion detection, object recognition, and/or facial recognition. Computer-vision includes methods for acquiring, processing, analyzing, and understanding images and, in general, high-dimensional data from the real world in order to produce numerical or symbolic information, e.g., in the form of decisions. Computer-vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer-vision has also been described as the enterprise of automating and integrating a wide range of processes and representations for vision perception. As a scientific discipline, computer-vision is concerned with the theory behind artificial systems that extract information from images. The image data can take many forms, such as video sequences, views from multiple cameras, or multi-dimensional data from a scanner.

One aspect of computer-vision comprises determining whether or not the image data contains some specific object, feature, or activity. Different varieties of computer-vision recognition include: Object Recognition (also called object classification)—One or several pre-specified or learned objects or object classes can be recognized, usually together with their 2D positions in the image or 4D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based at least in part on relatively simple and fast computations is sometimes used for finding smaller regions of interesting image data that can be further analyzed by more computationally demanding techniques to produce a correct interpretation.

Several specialized tasks based at least in part on computer-vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 4D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer-vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 416). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer-vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based at least in part on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 4D sensors to capture information about the shape of a face. This information is then used to identify distinctive features on the surface of a face, such as the contour of the eye sockets, nose, and chin.

One advantage of 4D face recognition is that it is not affected by changes in lighting like other techniques. It can also identify a face from a range of viewing angles, including a profile view. Three-dimensional data points from a face vastly improve the precision of face recognition. 4D research is enhanced by the development of sophisticated sensors that do a better job of capturing 4D face imagery. The sensors work by projecting structured light onto the face. Up to a dozen or more of these image sensors can be placed on the same CMOS chip—each sensor captures a different part of the spectrum.

Another variation is to capture a 4D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Again, with reference to FIG. 4, in embodiments where the camera device 106 includes a light camera, the camera device 106 may include the light controller 402 and one or more light sources 404(*a*), 404(*b*) (collectively referred to herein as "light sources 404"). The light controller 402 may include a switch for controlling the light sources 404. For example, in response to the motion sensor(s) 426 and/or the camera 414 detecting motion, the light controller 402 may receive an output signal from the processor(s) 410 that causes the light controller 402 to activate the one or more light sources 404(*a*), 404(*b*). In some embodiments, the light camera may include motion sensor(s) 426 detecting motion for controlling activation of the light sources 404, and may further include the camera 414 for detecting motion for activating the recording of the image data using the camera 414 and/or the recording of the audio data using the microphone(s) 428. In other embodiments, the motion sensor(s) 426 may detect the motion for activating the light sources 404, the camera 414, and the microphone(s) 428, or the camera 414 may detect the motion for activating the light sources 404, the camera 414 to being recording the image data, and the microphone(s) 428 to being recording the audio data. The light sources 404 may include floodlight sources, spotlight sources, porch light sources, or another type of illumination device. The light sources 404 may provide for better image data quality when ambient light levels are low (e.g., at dusk, dawn, or night), while also providing a deterrent effect by being illuminated when motion is detected.

With further reference to FIG. 4, in embodiments where the camera device 106 includes a doorbell, such as the video doorbell, the camera device 106 may include the button 406. In embodiments where the button 406 is a mechanical button (e.g., has a range of movement), the button 406 may make contact with a button actuator located within the video doorbell when the button 406 is pressed. In embodiments where the button 406 is not mechanical (e.g., has no range of motion), the button 406 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 406 is pressed, touched, and/or otherwise triggered, the processor(s) 410 may receive an output signal from the button 406 that may activate one or more functions of the video doorbell, such as causing the network interface 412 to transmit the signaling device 408 to cause the signaling device 408 to output a sound (e.g., via the wired 444(*b*) connection to the signaling device 408 and/or a wireless 444(*a*) connection to the signaling device 408). In addition, the processor(s) 410 may cause the network interface 412 to transmit an output signal to indicate to the user(s) of client device(s) that a person is present at the camera device 106.

Although the camera device 106 is referred to herein as an "audio/video" device, the camera device 106 need not have both audio and video functionality. For example, the camera device 106 may not include the speakers 440, microphones 428, and/or audio CODEC. In such examples, the camera device 106 may only have video recording and communication functionalities. In other examples, the camera device 106 may only have the speaker 440 and not the microphones 428, or may only have the microphones 428 and not the speakers 440.

FIGS. 5A-7 illustrate processes for selecting encoding parameters, according to various aspects of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 5A:
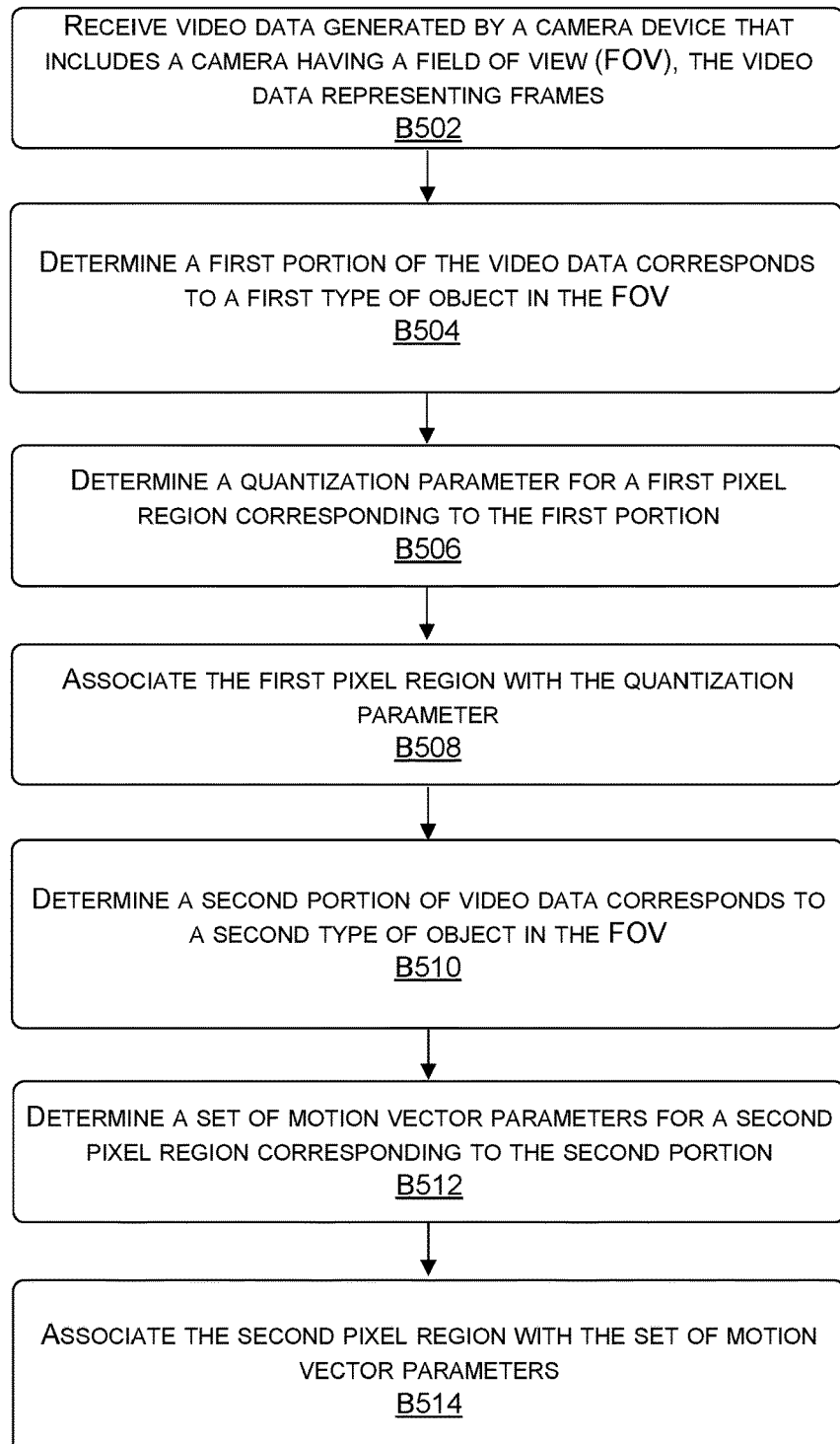
FIGS. 5A-5B are a flowchart illustrating an example process for selecting at least one quantization parameter and at least one motion parameter for encoding video data, according to various aspects of the present disclosure.
Figure 5B:
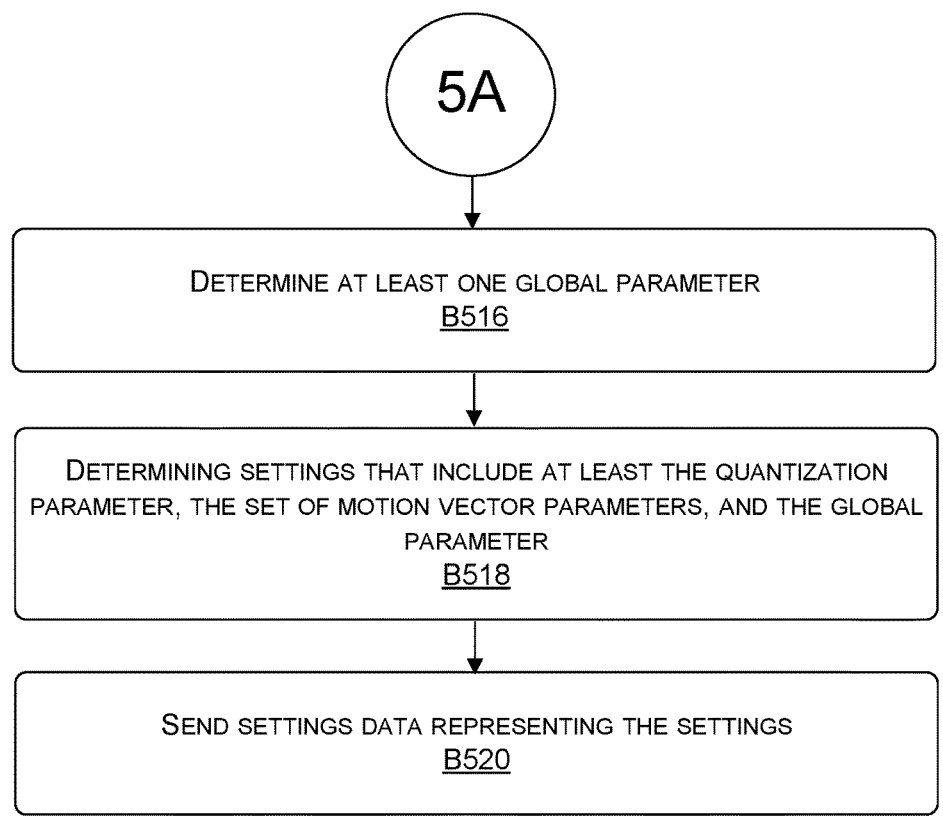

FIGS. 5A-5B are a flowchart illustrating an example process 500 for selecting at least one quantization parameter and at least one motion parameter for encoding video data, according to various aspects of the present disclosure. At block B502, the process 500 may include receiving video data generated by a camera device that includes a camera having a field of view (FOV), the video data representing frames. For instance, the remote system(s) 102 may receive the video data 104 from the camera device 106 that includes the camera 414 having the FOV 110. In some instances, the video data 104 represents one or more videos generated by the camera device 106 at various time(s). In some instances, the camera device 106 generates and then sends the video data 104 based at least in part on receiving, from the remote system(s) 102, the command data 222 representing a command to generate and send the video data 104.

At block B504, the process 500 may include determining that a first portion of the video data corresponds to a first type of object in the FOV. For instance, the remote system(s) 102 may analyze the video data 104. In some instances, the remote system(s) 102 analyze the video data 104 using one or more image segmentation techniques. Based at least in part on the analysis, the remote system(s) 102 may identify the portion 114(1) of the video data 104 that represents the first type of object in the FOV 110. In some instances, based at least in part on the analysis, the remote system(s) 102 may identify multiple portions 114(1)-(5) of the video data 104 that correspond to the first types of objects.

In some instances, image segmentation is the process of using computer-vision analysis to partition an image (e.g., a frame) into multiple segments (e.g., portions, pixels, etc.). Computer-vision analysis includes methods for acquiring, processing, analyzing, and understanding digital images, such as by extracting high-dimensional data from the real world in order to produce numerical or symbolic information. For example, image segmentation may use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be used to segment the frame(s) of the video.

Semantic segmentation includes assigning each pixel represented by video data to an object class. More specifically, the image data is analyzed in order to generate a mask with regions of interest that are highlighted. To identify the regions of interest, semantic segmentation clusters parts of an image represented by the image data, where each cluster belongs to a respective region of interest. The pixels included in each of the regions of interest are then assigned to an object class. For example, the remote system(s) 102 may analyze the video data 104 to generate a mask that includes a region of interest corresponding to the first portion 114(1). The remote system(s) 102 may then assign the pixels corresponding to the first portion 114(1) to the first type of object.

At block B506, the process 500 may include determining a quantization parameter for a first pixel region corresponding to the first portion. For instance, the remote system(s) 102 may analyze the first portion 114(1) of the video data 104 in order to determine the quantization parameter. In some instances, to perform the analysis, the remote system(s) 102 may use table data that associates different types of objects with different quantization parameters. In such instances, the table data may be generated by analyzing video data previously received by the remote system(s) 102. For instance, the remote system(s) 102 may have previously analyzed the video data using one or more neural networks in order to determine the quantization parameters for the different types of objects and/or different classes of objects represented by the video data. The remote system(s) 102 may then have generated the table data using the determined quantization parameters.

At block B508, the process 500 may include associating the first pixel region with the quantization parameter. For instance, the remote system(s) 102 may associate the first pixel region with the quantization parameter. In some instances, if the remote system(s) 102 select multiple quantization parameters, the remote system(s) 102 may associate various pixel regions corresponding to the other portions 114(2)-(5) of the video data 104 with the quantization parameters selected for the portion 114(2)-(5) of the video data 104 that also represent the first types of objects.

At block B510, the process 500 may include determining a second portion of the video data corresponding to a second type of object in the FOV. For instance, the remote system(s) 102 may analyze the video data 104. In some instances, the remote system(s) 102 analyze the video data 104 using one or more computer-vision techniques. Based at least in part on the analysis, the remote system(s) 102 may identify the second portion 114(6) of the video data 104 that represent the second type of object in the FOV 110.

At block B512, the process 500 may include determining a set of motion vector parameters for a second pixel region corresponding to the second portion. For instance, the remote system(s) 102 may analyze the second portions 116(6) of the video data 104 in order to determine the set of motion vector parameters. For instance, the video data 104 for this phase (e.g., motion vectors, MB partition tree, motion vector search range, thresholds for MP skip decisions, other RDO (rate distortion optimizations), I/P frame size ratio, HRD buffer size, etc.) may be searched using a global optimization procedure where some options are selected and the optimization procedure is then executed to see if it improves encoding. For instance, the remote system(s) 102 may analyze the second portion 114(6) of the video data 102 using various motion vector parameters in order to determine the motion vector parameters that provide the most improved encoding. The remote system(s) 102 may then select those motion vector parameters for the second portion 114(2) of the video data 104.

At block B514, the process 500 may include associating the second pixel region with the set of motion vector parameters. For instance, the remote system(s) 102 may associate the second pixels corresponding to the second portion 114(6) of the video data 104 with the set of motion vector parameters.

At block B516, the process 500 may include determining at least one global parameter. For instance, the remote system(s) 102 may analyze the video data 104 in order to determine the at least one global parameter. In some instances, the remote system(s) 102 analyze the video data 104 using rate-distortion optimization. As described herein, the one or more global parameters may include, but are not limited to, a number of P-Frames and/or B-Frames (and/or other frames) between I-Frames, types of frames, frame sizes, a number of frames to include in a GOP, bitrate parameters (e.g., VBR parameter), buffer size parameters, and/or other parameters.

At block B518, the process 500 may include determining settings that include at least the quantization parameter, the set of motion vector parameters, and the global parameter. For instance, the remote system(s) 102 may determine the settings that include at least the quantization parameter, the set of motion vector parameters, and the global parameter.

At block B520, the process 500 may include sending settings data representing the settings. For instance, the remote system(s) 102 may generate the settings data 118 representing the settings. The remote system(s) 102 may then send the settings data 118 to the camera device 106, which the camera device 106 may store. Later, when generating additional video data 104, the camera device 106 may use the settings data 118 to encode the additional video data 104.

Figure 6:
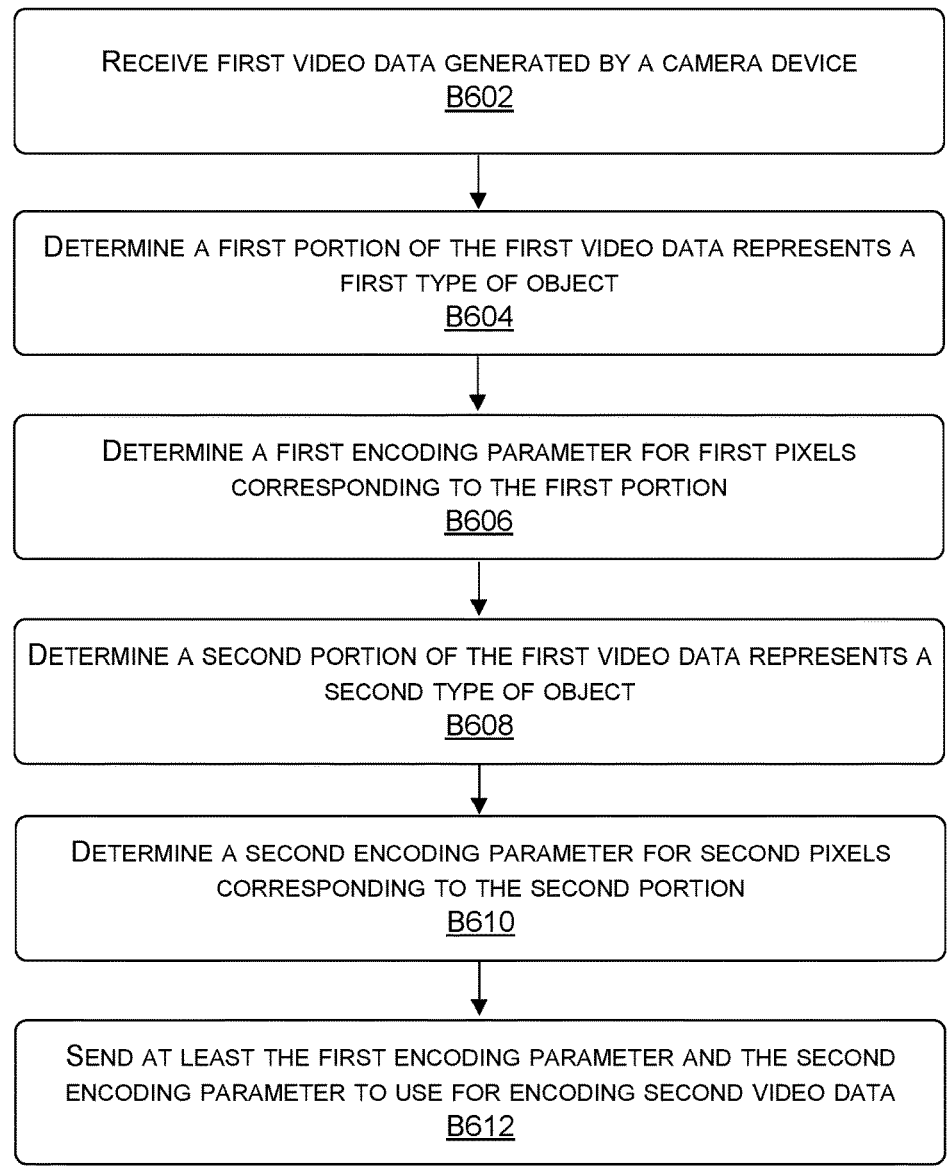
FIG. 6 is a flowchart illustrating an example process for selecting parameters for encoding video data on an electronic device, according to various aspects of the present disclosure.

FIG. 6 is a flowchart illustrating an example process 600 for selecting encoding parameters for the camera device 106, according to various aspects of the present disclosure. At block B602, the process 600 may include receiving first video data generated by a camera device. For instance, the remote system(s) 102 may receive the video data 104 from the camera device 106, where the camera device 106 includes a camera 414 having the FOV 110. In some instances, the video data 104 represents one or more videos generated by the camera device 106 at various time(s). In some instances, the camera device 106 generates and then sends the video data 104 based at least in part on receiving, from the remote system(s) 102, the command data 220 representing a command to generate and send the video data 104.

At block B604, the process 600 may include determining a first portion of the first video data represents a first type of object. For instance, the remote system(s) 102 may analyze the video data 104 to identify that the first portion 114(1) (or 116(6)) of the video data 104 representing the first type of object. In some instances, the remote system(s) 102 analyze the video data 104 using one or more image segmentation techniques. In some instances, the remote system(s) 102 analyze the video data 104 using one or more computer-vision techniques.

At block B606, the process 600 may include determining a first encoding parameter for first pixels corresponding to the first portion. For instance, the remote system(s) 102 may determine the first encoding parameter for the first pixels corresponding to the first portion 114(1) (or 116(6)) of the video data 104. In some instances, the first encoding parameter includes a first quantization parameter. In some instances, the first encoding parameter includes a first motion parameter.

At block B608, the process 600 may include determining a second portion of the first video data represents a second type of object. For instance, the remote system(s) 102 may analyze the video data 104 to identify the second portion 114(2) (or 114(6)) of the video data 104 representing the second type of object. In some instances, the remote system(s) 102 analyze the video data 104 using one or more image segmentation techniques. In some instances, the remote system(s) 102 analyze the video data 104 using one or more computer-vision techniques.

At block B610, the process 600 may include determining a second encoding parameter for second pixels corresponding to the second portion. For instance, the remote system(s) 102 may determine the second encoding parameter for the second pixels corresponding to the second portion 114(2) (or 114(6)) of the video data 104. In some instances, the second encoding parameter includes a second quantization parameter. In some instances, the second encoding parameter includes a second motion parameter.

At block B612, the process 600 may include sending at least the first encoding parameter and the second encoding parameter for encoding second video data. For instance, the remote system(s) 102 may generate the settings data 118 representing the first encoding parameter for the first pixels and the second encoding parameter for the second pixels. In some instances, the remote system(s) 102 may then send the settings data 118 to the camera device 106. The camera device 106 may then use the settings data 118 for encoding second video data 104 generated by the camera device 106.

Figure 7:
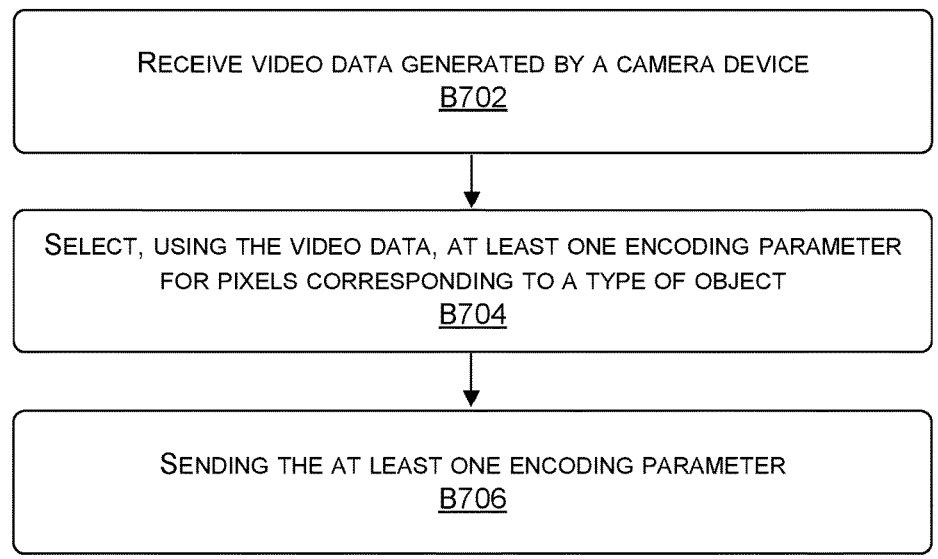
FIG. 7 is a flowchart illustrating an example process for remotely determining encoding parameters for an electronic device, according to various aspects of the present disclosure.

FIG. 7 is a flowchart illustrating an example process 700 for remotely determining encoding parameters for the camera device 106, according to various aspects of the present disclosure. At block B702, the process 600 may include receiving video data generated by a camera device. For instance, the remote system(s) 102 may receive the video data 104 from the camera device 106, where the camera device 106 includes a camera 414 having the FOV 110. In some instances, the video data 104 represents one or more videos generated by the camera device 106 at various time(s). In some instances, the camera device 106 generates and then sends the video data 104 based at least in part on receiving, from the remote system(s) 102, the command data 220 representing a command to generate and send the video data 104.

At block B704, the process 700 may include selecting, using the video data, at least one encoding parameter for pixels corresponding to a type of object. For instance, the remote system(s) 102 may select, using the video data 104, the at least one encoding parameter for the pixels corresponding to the type of object. In some instances, the at least one encoding parameter includes a quantization parameter. In some instances, the at least one encoding parameter includes a motion vector parameter. Still, in some instances, the at least one parameter includes a global parameter.

At block B706, the process 700 may include sending the at least one encoding parameter. For instance, the remote system(s) 102 may send, to the camera device 106, settings data 118 representing the at least one parameter.

Figure 8:
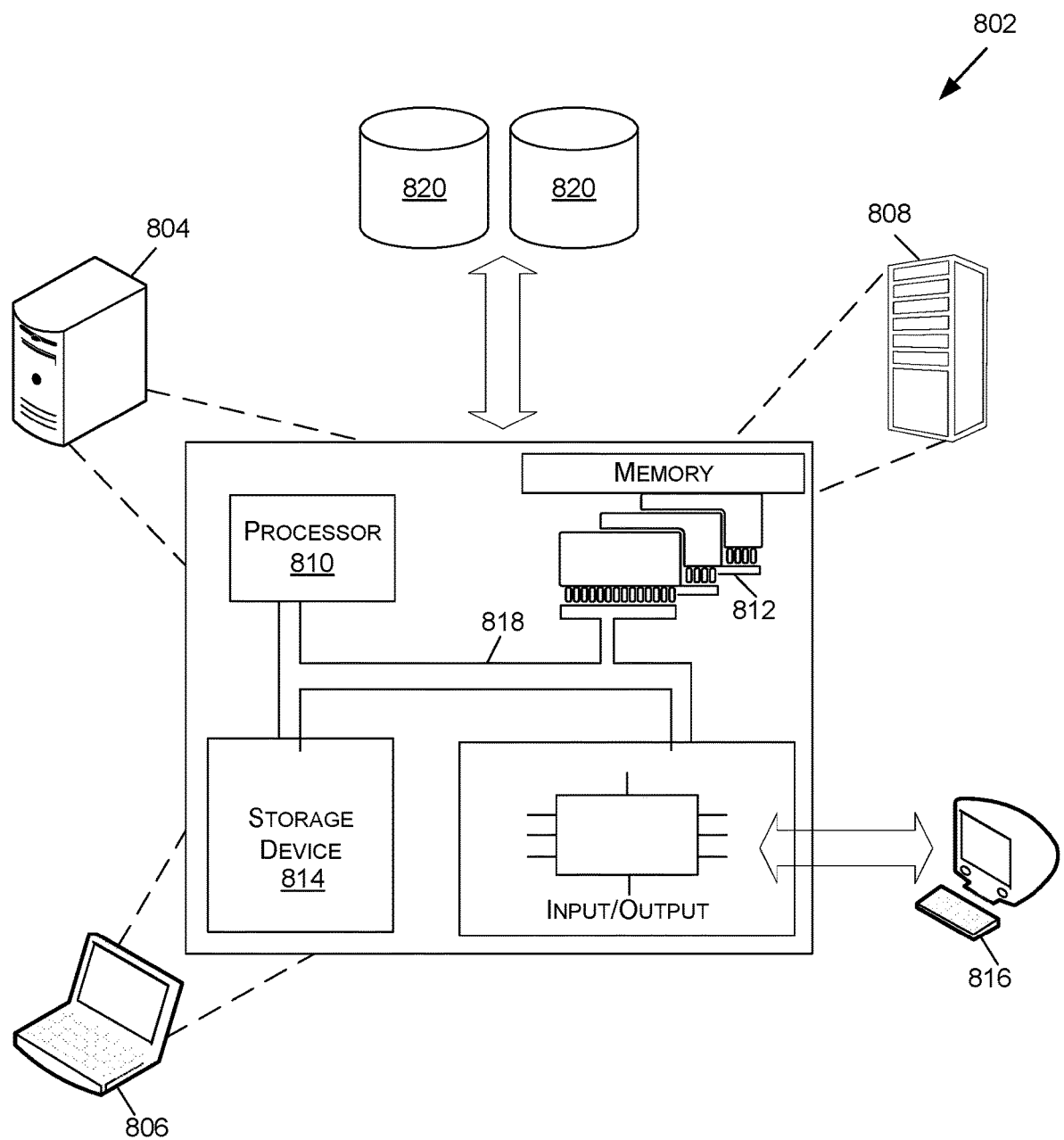
FIG. 8 is a functional block diagram of a general-purpose computing system on which the present embodiments may be implemented, according to various aspects of present disclosure.

FIG. 8 is a functional block diagram of a general-purpose computing system on which the present embodiments may be implemented according to various aspects of the present disclosure. The computer system 802 may be embodied in at least one of a personal computer (also referred to as a desktop computer) 804, a portable computer (also referred to as a laptop or notebook computer) 806, and/or a server 808 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 802 may execute at least some of the operations described above. The computer system 802 may include at least one processor 810, memory 812, at least one storage device 814, and input/output (I/O) devices 816. Some or all of the components 810, 812, 814, 816 may be interconnected via a system bus 818. The processor 810 may be single- or multi-threaded and may have one or more cores. The processor 810 execute instructions, such as those stored in the memory 812 and/or in the storage device 814. Information may be received and output using one or more I/O devices 816.

The memory 812 may store information, and may be a computer-readable medium, such as volatile or non-volatile memory. The storage device(s) 814 may provide storage for the system 802 and, in some embodiments, may be a computer-readable medium. In various aspects, the storage device(s) 814 may be a flash memory device, a hard disk device, an optical disk device, a tape device, or any other type of storage device.

The I/O devices 816 may provide input/output operations for the system 802. The I/O devices 816 may include a keyboard, a pointing device, and/or a microphone. The I/O devices 816 may further include a display unit for displaying graphical user interfaces, a speaker, and/or a printer. External data may be stored in one or more accessible external databases 820.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a component, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

Example Clauses

In a first aspect, a method comprises: receiving, by a computing system, and from a camera device having a field of view (FOV), first video data; determining, by the computing system using the first video data, that a first portion of the first video data corresponds to a first type of object in the FOV; determining, by the computing system, a quantization parameter for a first pixel region corresponding to the first portion of the first video data; determining, by the computing system using the first video data, that a second portion of the first video data corresponds to a second type of object in the FOV; determining, by the computing system, a set of motion vector parameters for a second pixel region corresponding to the second portion of the first video data; determining, by the computing system, at least one additional encoding parameter for pixel regions other than the first pixel region and the second pixel region; determining, by the computing system, settings for encoding second video data generated by the camera device, the settings including at least the quantization parameter for the first pixel region, the set of motion vector parameters for the second pixel region, and the at least one additional encoding parameter for pixel regions other than the first pixel region and the second pixel region; and sending, by the computing system, settings data representing the settings to the camera device.

In an embodiment of the first aspect, determining that the first portion of the first video data corresponds to the first type of object comprises performing image segmentation on the first video data.

In another embodiment of the first aspect, determining that the second portion of the first video data corresponds to the second type of object comprises at least: determining that the second portion of the first video data represents an amount of motion during a period of time; determining that the amount of motion is equal to or greater than a threshold amount of motion; and determining that the second portion of the first video data corresponds to the second type of object based at least in part on the amount of motion being equal to or greater than the threshold amount of motion.

In a second aspect, a method comprises: receiving first video data generated by a camera of a camera device, the first video data representing a video depicting a field of view (FOV) of the camera; determining, using the first video data, that a first portion of the first video data represents a first type of object in the FOV; determining a first encoding parameter for first pixels corresponding to the first portion of the first video data; determining, using the first video data, that a second portion of the first video data represents a second type of object in the FOV; determining a second encoding parameter for second pixels corresponding to the second portion of the first video data; and sending, to the camera device and for encoding second video data, at least the first encoding parameter for the first pixels and the second encoding parameter for the second pixels.

In an embodiment of the second aspect, determining, using the first video data, that the first portion of the first video data represents the first type of object in the FOV comprises performing image segmentation on the first video data to identify the first portion of the first video data that represents the first type of object in of the FOV.

In another embodiment of the second aspect, performing image segmentation on the first video data comprises performing semantic segmentation on the first video data.

In another embodiment of the second aspect, performing the semantic segmentation on the first video data comprises at least: determining that the first pixels represent the first type of object; determining that the first portion of the first video data represents the first pixels; and associating the first portion of the first video data with the first type of object.

In another embodiment of the second aspect, the first type of object comprises a sky, a wall, a ceiling, a roof, a sidewalk, a street, or a rock.

In another embodiment of the second aspect, the first video data is recorded at a first time, further comprising: receiving third video data generated by the camera of the camera device, the third video data being recorded at a second time that is different than the first time; determining a third encoding parameter for the first pixels corresponding to a third portion of the third video data; determining a fourth encoding parameter using at least the first encoding parameter and the third encoding parameter; and sending the fourth encoding parameter to the camera device.

In another embodiment of the second aspect, determining the fourth encoding parameter comprises at least one of: determining the fourth encoding parameter as an average of the first encoding parameter and the third encoding parameter; or determining the fourth encoding parameter as an interpolation between the first encoding parameter and the third encoding parameter.

In another embodiment of the second aspect, determining that the second portion of the first video data represents the second type of object in the FOV comprises: determining that the second portion of the first video data represents an amount of motion during a period of time; determining that the amount of motion is equal to or greater than a threshold amount of motion; and determining that the second portion of the first video data represents the second type of object based at least in part on the amount of motion being equal to or greater than the threshold amount of motion.

In another embodiment of the second aspect, the first video data is recorded at a first time, further comprising: receiving third video data generated by the camera of the camera device, the third video data being recorded at a second time that is different than the first time; determining that a third portion of the third video data represents an additional amount of motion during the period of time or an additional period of time, the third portion of the third video data corresponding to the second portion of the first video data; determining that the additional amount of motion is equal to or greater than the threshold amount of motion; and determining that the third portion of the second video data represents the second type of object based at least in part on the additional amount of motion being equal to or greater than the threshold amount of motion.

In another embodiment of the second aspect, the second type of object comprises an object that is moving in a pattern, the pattern including at least one of an oscillating pattern, a harmonic pattern, or a reciprocal motion.

In another embodiment of the second aspect, determining the first encoding parameter for the first pixels corresponding to the first portion of the first video data comprises at least: storing table data that associates the first encoding parameter with the first type of object; and after determining that the first portion of the first video data represents the first type of object, selecting the first encoding parameter for the first pixels corresponding to the first portion of the first video data.

In another embodiment of the second aspect, determining the first encoding parameter for the first pixels corresponding to the first portion of the first video data comprises at least: analyzing the first portion of the first video data to determine a pixel range associated with the first pixels; and selecting the first encoding parameter using at least the pixel range.

In another embodiment of the second aspect, further comprising: determining at least one additional encoding parameter for pixels other than the first pixels and the second pixels; and sending, to the camera device, the at least one additional encoding parameter for pixels other than the first pixels and the second pixels.

In another embodiment of the second aspect, determining the at least one additional encoding parameter comprises performing rate-distortion optimization on the first video data.

In another embodiment of the second aspect, further comprising: identifying a first subset of the first pixels, the first subset corresponding to a first sub-portion of the first video data; associating the first encoding parameter with the first subset of the first pixels; identifying a second subset of the first pixels, the second subset corresponding to a second sub-portion of the first video data; and associating the first encoding parameter with the second sub-portion.

In a third aspect, one or more computing devices comprise: one or more network interfaces; one or more processors; and one or more computer-readable media storing instructions that, when executed by the one or more processors, cause the one or more processors to perform operations comprising: receiving, using the one or more network interfaces, video data generated by a camera of a camera device, the video data representing a video depicting a field of view (FOV) of the camera; selecting, using the video data, at least one encoding parameter for pixels corresponding to a type of object in the FOV of the camera; and sending, using the one or more network interfaces, the at least one encoding parameter to the camera device.

In an embodiment of the third aspect, the one or more computer-readable media storing further instructions that, when executed by the one or more processors, cause the one or more processors to perform further operations comprising performing image segmentation on the video data to identify that a portion of the video data represents the type of object, the portion of the video data corresponding to the pixels.

What is claimed is:

1. A method comprising:
    receiving, by a computing system, and from a camera device, first video data;
    determining, by the computing system, that a first portion of the first video data represents a first type of object;
    determining, by the computing system, a quantization parameter for a first pixel region corresponding to the first portion of the first video data;
    determining, by the computing system, that a second portion of the first video data represents a second type of object;
    determining, by the computing system, a set of motion vector parameters for a second pixel region corresponding to the second portion of the first video data;
    determining, by the computing system, at least one additional encoding parameter for a third pixel region that is different than the first pixel region and the second pixel region;
    determining, by the computing system, settings for encoding second video data generated by the camera device, the settings including at least the quantization parameter for the first pixel region, the set of motion vector parameters for the second pixel region, and the at least one additional encoding parameter for the third pixel region; and
    sending, by the computing system, settings data representing the settings to the camera device.

2. The method as recited in claim 1, wherein the determining that the first portion of the first video data represents the first type of object comprises performing image segmentation on the first video data to determine that the first portion of the first video data represents the first type of object.

3. The method as recited in claim 1, wherein the determining that the second portion of the first video data represents the second type of object comprises at least:
    determining that the second portion of the first video data represents an amount of motion during a period of time;
    determining that the amount of motion is equal to or greater than a threshold amount of motion; and
    determining that the second portion of the first video data corresponds to the second type of object based at least in part on the amount of motion being equal to or greater than the threshold amount of motion.

4. A method comprising:
receiving first video data generated by a camera device, the first video data representing a video depicting a field of view (FOV) of the camera device;
determining that a first portion of the first video data represents a first type of object;
determining a first encoding parameter for the first portion of the first video data;
determining that a second portion of the first video data represents a second type of object;
determining a second encoding parameter for the second portion of the first video data;
sending, to the camera device, the first encoding parameter for encoding a first portion of second video data, the first portion of the second video data being associated with the first portion of the first video data; and
sending, to the camera device, the second encoding parameter for encoding a second portion of the second video data, the second portion of the second video data being associated with the second portion of the first video data.

5. The method as recited in claim 4, wherein the determining that the first portion of the first video data represents the first type of object comprises performing image segmentation on the first video data to identify the first portion of the first video data that represents the first type of object.

6. The method as recited in claim 4, wherein the first video data is generated at a first time, the method further comprising:
receiving third video data generated by the camera device, the third video data being generated at a second time that is different than the first time;
determining a third encoding parameter for a portion of the third video data, the portion of the third video data being associated with the first portion of the first video data;
determining a fourth encoding parameter using at least the first encoding parameter and the third encoding parameter; and
sending the fourth encoding parameter to the camera device.

7. The method as recited in claim 6, wherein the determining of the fourth encoding parameter comprises at least one of:
determining the fourth encoding parameter as an average of the first encoding parameter and the third encoding parameter; or
determining the fourth encoding parameter as an interpolation between the first encoding parameter and the third encoding parameter.

8. The method as recited in claim 4, wherein the determining that the second portion of the first video data represents the second type of object comprises:
determining that the second portion of the first video data represents a first amount of motion during a first period of time;
determining that the first amount of motion is equal to or greater than a threshold amount of motion; and
determining that the second portion of the first video data represents the second type of object based at least in part on the first amount of motion being equal to or greater than the threshold amount of motion.

9. The method as recited in claim 8, wherein the first video data is generated at a first time, the method further comprising:
receiving third video data generated by the camera device, the third video data being generated at a second time that is different than the first time,
determining that a portion of the third video data represents a second amount of motion during a second period of time, the portion of the third video data being associated with the second portion of the first video data;
determining that the second amount of motion is equal to or greater than the threshold amount of motion; and
determining that the portion of the second video data represents the second type of object based at least in part on the second amount of motion being equal to or greater than the threshold amount of motion.

10. The method as recited in claim 4, wherein the second type of object comprises an object that is moving in a pattern, the pattern including at least one of an oscillating pattern, a harmonic pattern, or a reciprocal motion.

11. The method as recited in claim 4, wherein the determining the first encoding parameter for the first portion of the first video data comprises at least:
storing table data that associates the first encoding parameter with the first type of object; and
based at least in part on the determining that the first portion of the first video data represents the first type of object, selecting the first encoding parameter for the first portion of the first video data.

12. The method as recited in claim 4, wherein the determining the first encoding parameter for the first portion of the first video data comprises at least:
determining a pixel range associated with the first portion of the first video data; and
selecting the first encoding parameter using at least the pixel range.

13. The method as recited in claim 4, further comprising:
determining a third encoding parameter for a third portion of the first video data; and
sending, to the camera device, the third encoding parameter.

14. The method as recited in claim 13, wherein the determining the third encoding parameter comprises performing rate-distortion optimization on the first video data to determine the third encoding parameter.

15. The method as recited in claim 4, further comprising:
identifying a first subset of the first pixels, the first subset corresponding to a first sub-portion of the first video data;
associating the first encoding parameter with the first subset of the first pixels;
identifying a second subset of the first pixels, the second subset corresponding to a second sub-portion of the first video data; and
associating the first encoding parameter with the second sub-portion.

16. The method as recited in claim 4, wherein:
the first portion of the second video is associated with the first portion the first video data based at least in part on the first portion of the second video data depicting the first type of object; and
the second portion of the first video data is associated with the second portion of the first video data based at least in part on the second portion of the second video data depicting the second type of object.

17. The one or more computing devices as recited in claim 16, wherein the sending of the indication associated with the first portion of the FOV comprises at least one of:
- sending, using the one or more network interfaces and to the camera device, first data that identifies the first portion of the video data; or
- sending, using the one or more network interfaces and to the camera device, second data that identifies the first portion of the FOV.

18. The method as recited in claim 4, wherein:
the first portion of the second video is associated with the first portion the first video data based at least in part on:
- the first portion of the first video data representing a first portion of the FOV; and
- the first portion of the second video data also representing the first portion of the FOV; and the second portion of the first video data is associated with the second portion of the first video data based at least in part on:
- the second portion of the first video data representing a second portion of the FOV; and
- the second portion of the second video data also representing the second portion of the FOV.

19. The one or more computing devices as recited in claim 4, the one or more computer-readable media storing further instructions that, when executed by the one or more processors, cause the one or more processors to perform further operations comprising:
- determining that a second portion of the video data represents a second object;
- determining a second type associated with the second object;
- selecting, based at least in part on the second type, a second encoding parameter for the second portion of the video data;
- sending, using the one or more network interfaces and to the camera device, an indication associated with a second portion of the FOV of the camera device, the second portion of the FOV being associated with the second portion of the video data; and
- sending, using the one or more network interfaces and to the camera device, the second encoding parameter associated with the second portion of the FOV.

20. One or more computing devices comprising:
one or more network interfaces;
one or more processors; and
one or more computer-readable media storing instructions that, when executed by the one or more processors, cause the one or more processors to perform operations comprising:
- receiving, using the one or more network interfaces, video data generated by a camera device, the video data representing a field of view (FOV) of the camera device;
- determining that a first portion of the video data represents a first object;
- determining a first type associated with the first object;
- selecting, based at least in part on the first type, a first encoding parameter for the first portion of the video data;
- sending, using the one or more network interfaces and to the camera device, an indication associated with a first portion of the FOV of the camera device, the first portion of the FOV being associated with the first portion of the video data; and
- sending, using the one or more network interfaces and to the camera device, the first encoding parameter associated with the first portion of the FOV.

* * * * *

UNITED STATES PATENT AND TRADEMARK OFFICE
CERTIFICATE OF CORRECTION

PATENT NO. : 11,276,180 B1
APPLICATION NO. : 16/586332
DATED : March 15, 2022
INVENTOR(S) : Jason Gluckman et al.

Page 1 of 1

It is certified that error appears in the above-identified patent and that said Letters Patent is hereby corrected as shown below:

In the Claims

Column 42, Line 9, change "One or more" to -- The one or more --.

Signed and Sealed this
Twenty-ninth Day of November, 2022

Katherine Kelly Vidal
*Director of the United States Patent and Trademark Office*